United States Patent
Strahlendorf et al.

(10) Patent No.: US 10,746,348 B2
(45) Date of Patent: Aug. 18, 2020

(54) SYSTEMS AND METHODS FOR DELIVERING AND SECURING A MAGNETIC PACKAGE DELIVERED BY A DRONE ONTO A MAGNETIC DELIVERY PLATFORM

(71) Applicant: Ford Global Technologies, LLC, Dearborn, MI (US)

(72) Inventors: Frederick Karl Strahlendorf, Long Beach, CA (US); Sravani Yajamanam Kidambi, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/999,391

(22) Filed: Aug. 20, 2018

(65) Prior Publication Data
US 2020/0056739 A1 Feb. 20, 2020

(51) Int. Cl.
| F16M 11/00 | (2006.01) |
| F16M 11/18 | (2006.01) |
| F16M 11/10 | (2006.01) |
| F16M 11/20 | (2006.01) |
| F16M 11/24 | (2006.01) |
| B65G 47/00 | (2006.01) |
| G08G 5/00 | (2006.01) |
| F16M 13/02 | (2006.01) |
| G06Q 50/28 | (2012.01) |

(52) U.S. Cl.
CPC .............. *F16M 11/18* (2013.01); *B65G 47/00* (2013.01); *F16M 11/10* (2013.01); *F16M 11/2021* (2013.01); *F16M 11/24* (2013.01); *F16M 13/022* (2013.01); *G08G 5/0069* (2013.01); *F16M 2200/068* (2013.01); *G06Q 50/28* (2013.01)

(58) Field of Classification Search
CPC .................................................. A47G 29/141
See application file for complete search history.

(56) References Cited

U.S. PATENT DOCUMENTS

| 9,840,340 B2 | 12/2017 | O'Toole | |
| 9,975,651 B1 | 5/2018 | Eck et al. | |
| 2015/0158599 A1* | 6/2015 | Sisko | B64F 1/32 244/114 R |
| 2016/0144982 A1 | 5/2016 | Sugumaran | |
| 2017/0073085 A1 | 3/2017 | Tremblay et al. | |
| 2017/0089508 A1* | 3/2017 | Daczko | F16M 11/18 |
| 2017/0197792 A1* | 7/2017 | Alonso Ramila | B65G 21/2036 |
| 2017/0267348 A1 | 9/2017 | Sweeny et al. | |
| 2018/0092484 A1 | 4/2018 | Lewis et al. | |

* cited by examiner

*Primary Examiner* — Amy J. Sterling
(74) *Attorney, Agent, or Firm* — Brandon Hicks; Eversheds Sutherland (US) LLP

(57) ABSTRACT

Systems and methods are disclosed for a package delivery platform. The package delivery platform may be configured to receive a package from a drone. The package may include a magnetic material. The package delivery platform may include a platform body, a plurality of magnets disposed about the platform body, and a controller configured to control the plurality of magnets in order to secure the package to the platform body.

9 Claims, 19 Drawing Sheets

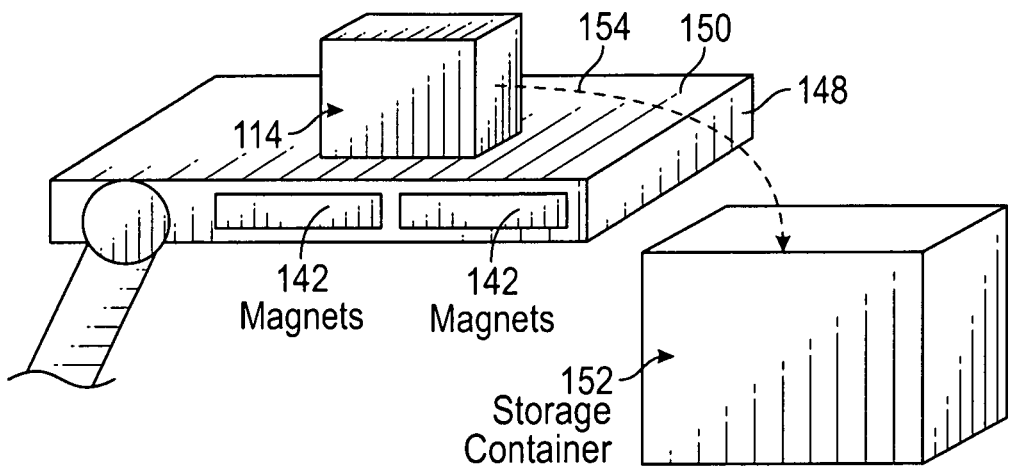
FIG. 2
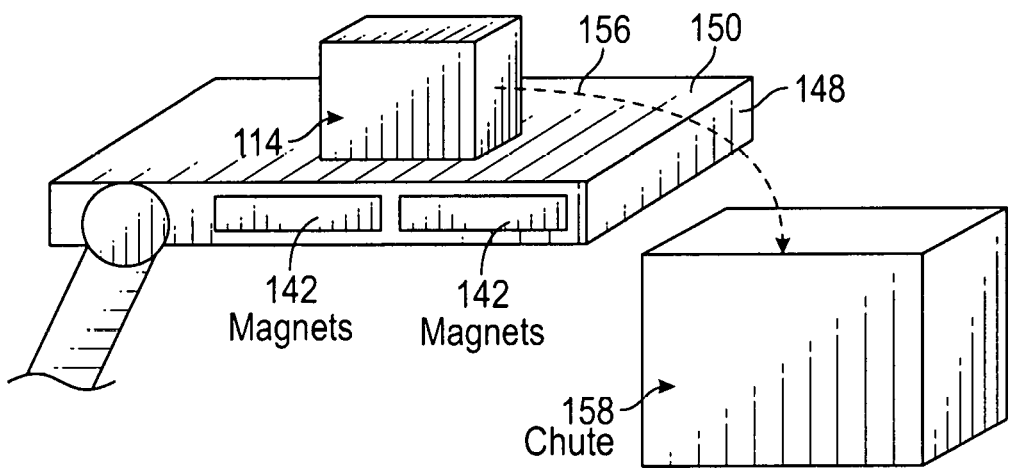
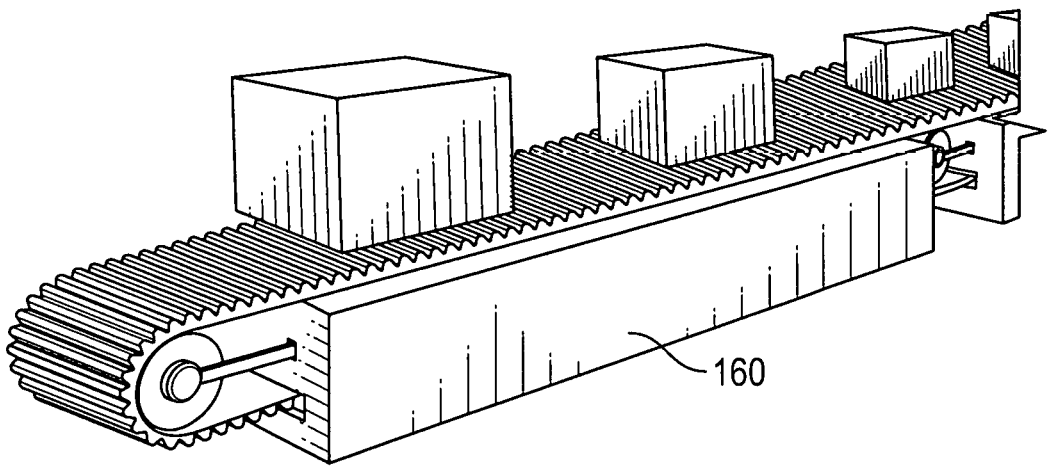
FIG. 3

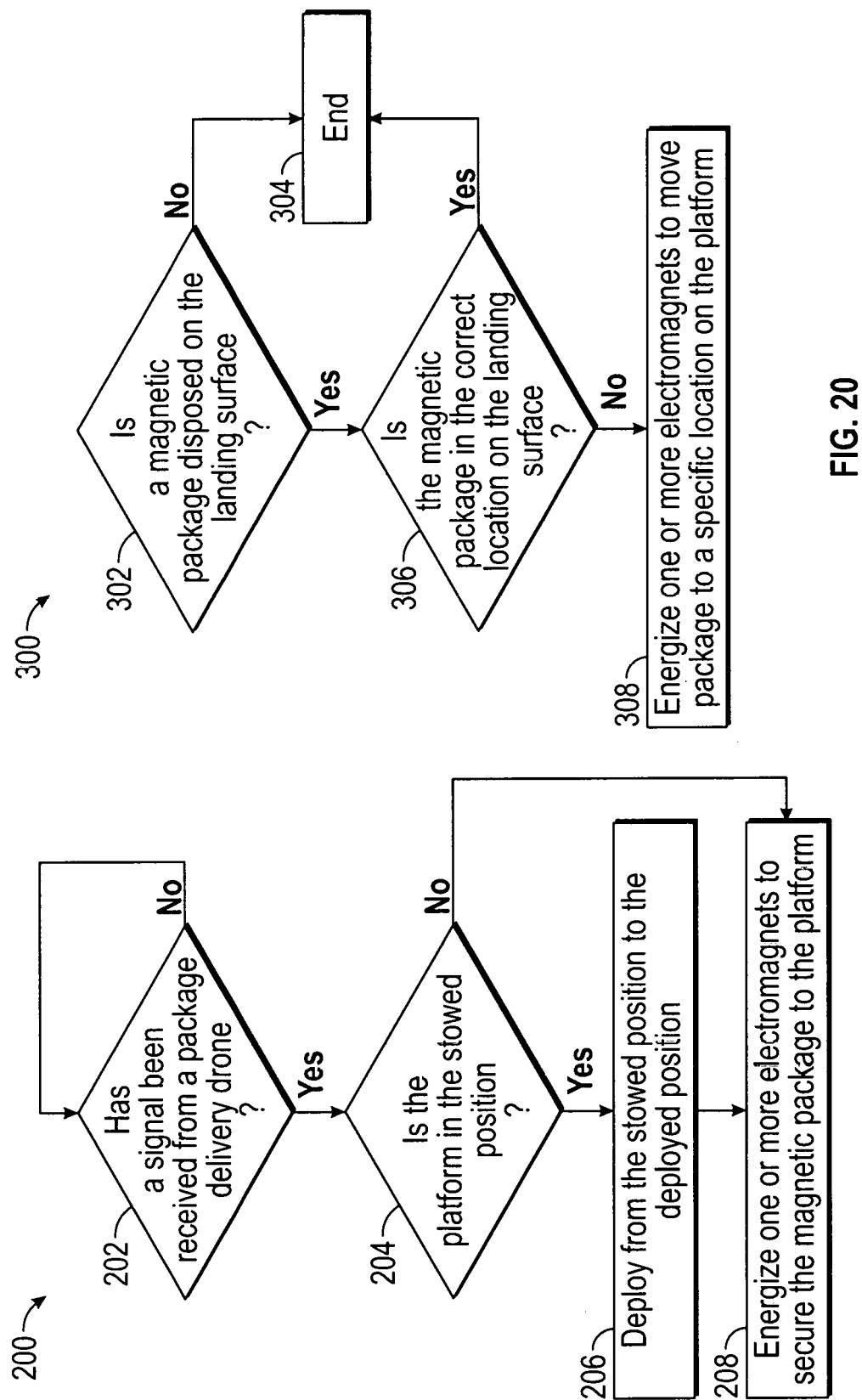

SYSTEMS AND METHODS FOR DELIVERING AND SECURING A MAGNETIC PACKAGE DELIVERED BY A DRONE ONTO A MAGNETIC DELIVERY PLATFORM

FIELD OF THE DISCLOSURE

The disclosure generally relates to the delivery of packages by a drone, and more particularly relates to systems and methods for delivering and securing a magnetic package delivered by a drone onto a magnetic delivery platform.

BACKGROUND

Companies are expressing interest in utilizing fleets of drones to deliver packages to consumers at a business or residence. In some instances, drones may be problematic for delivery to customers. For example, a drone that is powered by a rotor or an impeller may be dangerous to customers, pets, overhead power lines, ceiling fans, or other features. Furthermore, the drone may not recognize a safe place to deliver a package. For example, leaving the package on the front porch of a busy street may make it more likely that the package is stolen. In addition, a package delivered by a drone can be vulnerable to weather conditions. For example, in high-density urban areas, a package delivered by a drone onto the balcony of an apartment may be susceptible to wind gusts or other hazardous weather conditions. Thus, conventional aerial delivery device methods do not allow for safe, secure delivery of packages to delivery locations.

Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2 depicts a magnetic delivery platform and container in accordance with one or more embodiments of the disclosure.

FIG. 3 depicts a magnetic delivery platform, chute, and conveyer belt, in accordance with one or more embodiments of the disclosure.

FIG. 19 depicts a flow diagram for delivering and securing a magnetic package delivered from a drone onto a magnetic delivery platform in accordance with one or more embodiments of the disclosure.

FIG. 20 depicts a flow diagram for delivering and securing a magnetic package delivered from a drone onto a magnetic delivery platform in accordance with one or more embodiments of the disclosure.

DETAILED DESCRIPTION

Overview

Figure 1:
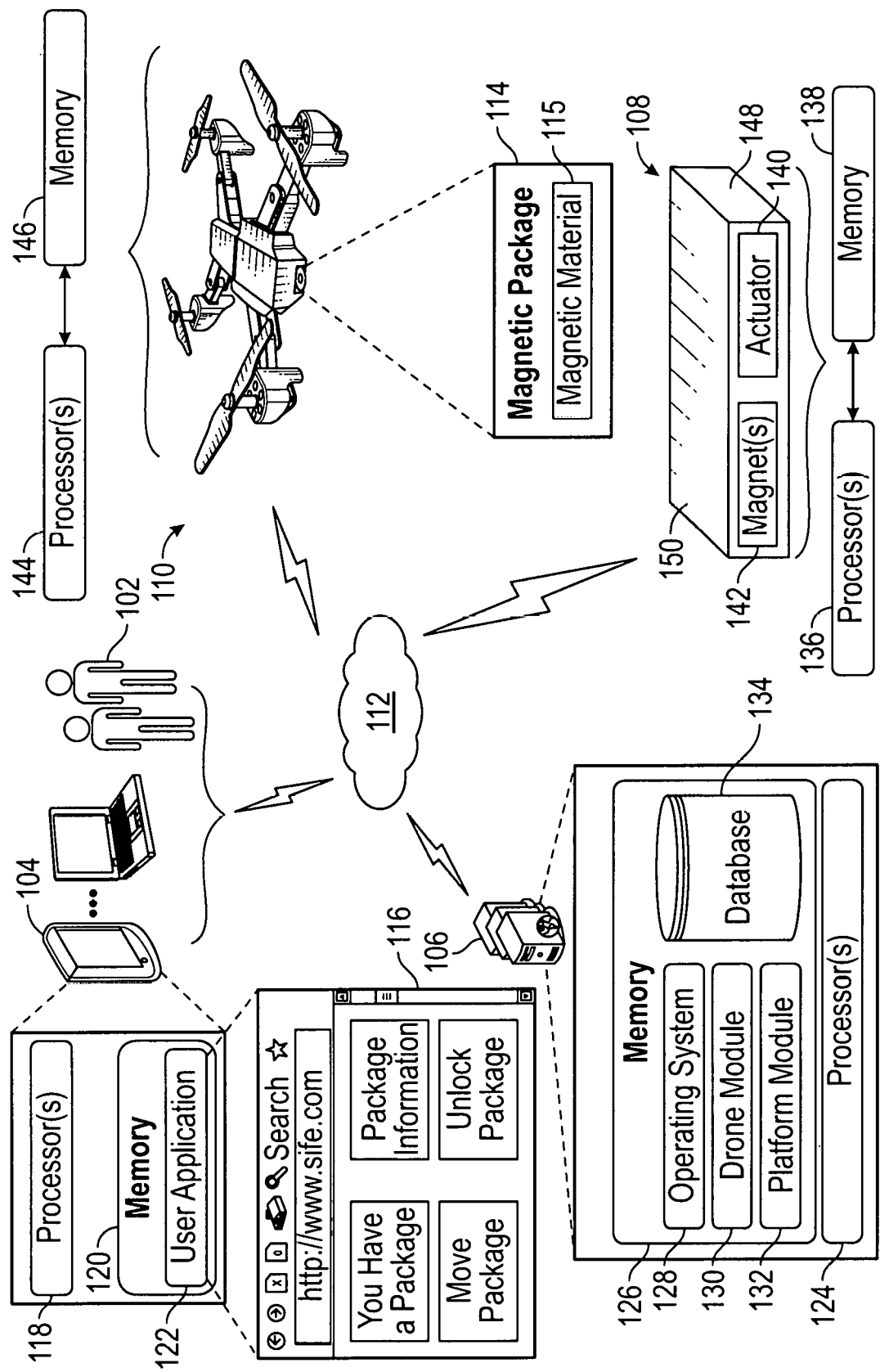
FIG. 1 depicts an illustrative architecture in accordance with one or more embodiments of the disclosure.

The disclosure is related to systems and methods for delivering and securing a magnetic package that is delivered from a drone onto a magnetic delivery platform. For example, the magnetic delivery platform may include one or more magnets configured to be activated to attract and secure the magnetic package to the magnetic delivery platform. In this manner, the drone may deliver and release the magnetic package on, at, or near the magnetic delivery platform, and the one or more magnets of the magnetic delivery platform may be activated to magnetically attract and secure the magnetic package to the magnetic delivery platform. In other instances, the one or more magnets of the magnetic delivery platform may be configured to be activated to attract (or repel) the magnetic package to a specific location on the magnetic delivery platform or to direct the magnetic package to a location off of the magnetic delivery platform.

In certain embodiments, the drone may be an unmanned aerial vehicle (UAV). In some instances, the drone may be autonomous. In other instances, the drone may be remotely piloted. The drone may be any suitable size, shape, or configuration. In some instances, the drone may be capable of delivering a magnetic package. For example, the drone may be capable of transporting the magnetic package during flight and releasing the magnetic package on, at, or near the magnetic delivery platform. The drone also may be capable of communicating with the magnetic delivery platform using, for example, Bluetooth, near-field communication (NFC), Wi-Fi or Wi-Fi direct, or over a wireless network.

In some instances, the magnetic delivery platform may be located at a residence, such as a house, an apartment, or a condominium. In certain embodiments, the magnetic delivery platform may be disposed on or about a balcony of a residential building. In this manner, the magnetic delivery platform may be utilized in high density urban areas. The magnetic delivery platform may be located in any suitable location about a residence. In other instances, the magnetic delivery platform may be located at a commercial property. The magnetic delivery platform may be located at any commercial or residential location that a drone may deliver a package.

The magnetic package may include magnetic material. In some instances, the magnetic material may be a permanent magnet. In one example embodiment, the contents of the magnetic package may be magnetic. For example, an item being delivered in the magnetic package by the drone may be wholly or partially magnetic. In another example embodiment, the packaging within the magnetic package may be wholly or partially magnetic. For example, at least some of the packaging used to wrap or protect the item being delivered by the done may comprise a ferromagnetic material. In another example embodiment, a magnetic material may be imbedded into the magnetic package. For example, a ferromagnetic material may be imbedded (e.g., woven, injected, formed, etc.) into the walls of the magnetic package. In some instances, a magnetic wire mesh may be incorporated into the walls of the magnetic package. In another example embodiment, a ferromagnetic material may be placed inside the magnetic package. For example, a magnetic sheet (e.g., ferrous foil or the like) may be placed inside the package. In another example embodiment, the magnetic material may be an electromagnet. For example, the magnetic package may include a power supply (e.g., a battery and/or a solar cell) capable of creating an electric current through a wire coil, which in turn may create a suitable magnetic field about the magnetic package. Any material, object, or device that possesses or is capable of creating a suitable magnetic field about the magnetic package may be used herein in combination with or form part of the magnetic package.

The magnetic package delivery platform may include a platform body. The platform body may be any suitable size, shape, or configuration. In some instances, the platform body may be sized and shaped to receive a magnetic package thereon. That is, the drone may deliver and release the magnetic package on, at, or near the platform body. In some instances, the platform body may include a landing surface, which may be sized and shaped to receive one or more magnetic packages thereon. In some instances, the landing surface of the platform body may be substantially planer. The landing surface of the platform body may be any suitable size, shape, or configuration.

In certain embodiments, the platform body may include a stowed position and a deployed position. That is, when not in use, the platform body may be stowed in the stowed position to limit its footprint. On the other hand, when a magnetic package is to be delivered by the drone, the platform body may be deployed from the stowed position to the deployed position. In some instance, after the magnetic package has been removed from the landing surface of the platform body, the platform body may be re-stowed to the stowed position until the next magnetic package is delivered. In one example embodiment, when in the stowed position, the platform body may be disposed in a vertical configuration. For example, the landing surface may be substantially upright when in the stowed position. In another example embodiment, when in the deployed position, the platform body may be in a horizontal configuration. For example, the landing surface may be disposed substantially horizontal when in the deployed position.

One or more magnets may be disposed about the platform body. In some instances, the magnets may be disposed on or within the platform body. In other instances, the magnets may be disposed below the platform body. In one example embodiment, the magnets may be disposed about the landing surface of the platform body. In some instances, the magnets may be configured to attract and secure the magnetic package delivered by the drone to the landing surface of the platform body. For example, the drone may deliver and release the magnetic package on, at, or near the landing surface of the platform body, and the magnets disposed about the landing surface of the platform body may be activated to attract the magnetic package to the landing surface of the platform body. The magnets disposed about the landing surface of the platform body may also be activated to secure the magnetic package on the landing surface of the platform body after the magnetic package has been delivered by the drone.

In some instances, the magnets may be configured to be activated to attract (or repel) the magnetic package to a specific location on the landing surface of the platform body. In other instances, the magnets may be configured to be activated to attract (or repel) the magnetic package to a location off of or next to the landing surface of the platform body. The magnets disposed about the landing surface of the platform body may be any suitable size, shape, or configuration.

In certain embodiments, the magnets disposed about the landing surface of the platform body may be electromagnets. For example, the magnetic delivery platform may include a power supply (e.g., a power adapter receptacle configured to receive a power adapter, a battery, and/or a solar cell) capable of creating an electric current through a wire coil about the platform body, which in turn may create a suitable magnetic field about the landing surface of the platform body. Any material, object, or device that possesses or is capable of creating a suitable magnetic field about the landing surface of the platform body to attract the magnetic package to the landing surface of the platform body may be used herein in combination with or form part of the magnetic delivery platform.

In certain embodiments, the electromagnets may be disposed at various locations about the platform body. For example, some of the electromagnets may be disposed about a center of the platform body, while other electromagnets may be disposed about a periphery of the platform body. The electromagnets may be disposed in any suitable configuration about the platform body.

In some instances, the electromagnets may be divided into a plurality of sections about the platform body. For example, a first set of the electromagnets may be grouped together to form a first section. Similarly, a second set of the electromagnets may be grouped together to form a second section. The electromagnets may be grouped together in any suitable number of sections. In some instances, each of the sections may be associated with a specific location or area of the landing surface of the platform body. For example, the first set of the electromagnets may be disposed at and associated with a central portion of the landing surface of the platform body, while the second set of the electromagnets may be disposed at and associated with a periphery of the landing surface of the platform body. In other instances, each corner of the landing platform may include a section of electromagnets that are grouped together. In one example embodiment, the electromagnets may be grouped together to form concentric squares or circles on the landing surface of the platform body. The electromagnet sections may be arranged in any suitable configuration about the landing surface of the platform body.

The magnetic delivery platform may include one or more computing devices, such as a controller or the like, configured to cause one or more of the electromagnets to energize in order to secure the magnetic package to the landing surface of the platform body. The controller may be any computing device comprising at least one processor in communication with at least one memory. The controller may be in communication with the power supply and the electromagnets.

In one example embodiment, the drone may instruct the controller that it intends to deliver a magnetic package to the magnetic delivery platform. In this manner, the controller may cause one or more of the electromagnets disposed about the landing surface of the platform body to be energized to create a suitable electromagnetic field about the landing surface of the platform body to ensure that the magnetic package is attracted to the landing surface of the platform body. The controller may energize each electromagnet individually, in sections, or as a group. In one example embodiment, the controller may energize all of the electromagnets at the same time. In another example embodiment, the controller may energize some, but not all, of the electromagnets. In another example embodiment, the controller may energize the electromagnets in sections, as discussed above. For example, the controller may energize all of the electromagnets located about a central area of the landing surface of the platform, a periphery of the landing area of the platform, or both. In some instances, the controller may energize one or more of the electromagnet sections forming concentric squares or circles in a sequence to move the magnetic package about the landing surface of the platform body.

In certain embodiments, the controller may be configured to cause one or more of the electromagnets to energize to move the magnetic package to a specific location on the platform body. For example, if the magnetic package is located on an outer edge of the landing surface, the controller may energize one or more the electromagnets to attract (or repel) the magnetic package to a center portion of the landing surface of the platform body. The controller may energize any number of the electromagnets to move the magnetic package to any location about the landing surface of the platform body.

In other instances, the controller may be configured to cause one or more of the electromagnets to energize to move the magnetic package off of the landing surface of the platform body. For example, the controller may be configured to energize one or more of the electromagnets to move the magnetic package off of the platform body and into a container disposed adjacent to the platform body. The container may be a secure lock box or the like. In other instances, the controller may be configured to energize one or more of the electromagnets to move the magnetic package off of the platform body and into a chute disposed adjacent to the platform body. The chute may direct the magnetic package to a central deposit for storage. In some instances, the chute may direct the magnetic package to a conveyer belt, which may direct the magnetic package to a storage area.

In certain embodiments, the controller may be configured to cause the platform body to move from the deployed position to the stowed position and vice versa. For example, the controller may be in communication with an actuator in mechanical communication with the platform body. In this manner, the controller may instruct the actuator to move the platform body between the deployed position and the stowed position. For example, the drone may indicate to the controller that it intends to deliver a magnetic package to the magnetic delivery platform. In this manner, the controller may cause the actuator to lower the platform body from the stowed position to the deployed position. After the magnetic package has been delivered, the controller may instruct the actuator to move the platform body back to the stowed position.

In some instances, the controller may be configured to cause the platform body to move from the deployed position to the stowed position when the package is at the specific location on the platform body. For example, one or more of the electromagnets may be energized by the controller to magnetically attach the magnetic package to the landing surface of the platform body. The controller may then instruct the actuator to move the platform body into the stowed position (that is, the vertical configuration) while the magnetic package is still magnetically attached to the landing surface of the platform body. Next, the controller may move the package off of the platform body when the platform is in the stowed position. For example, the controller may energize one or more of the electromagnets to attract (or repel) the magnetic package to move (or "crawl") the magnetic package along the landing surface of the platform body and onto the floor or into a storage area, a container, or a chute disposed adjacent to the magnetic delivery platform.

As noted above, the magnetic delivery platform may be located on or about a balcony or window of a residential building, such as an apartment or condominium. In this manner, the systems and methods described herein may facilitate the quick delivery of magnetic packages in high-density urban environments (e.g., high-rise buildings, apartment/condominium complexes, etc.). Rather than having the drones traveling through the interior of a building and possibly needing a security code to enter, the drones can deliver the magnetic packages directly onto individual magnetic delivery platforms on user balconies or to a centralized magnetic delivery platform for the entire building.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Turning now to the drawings, FIG. 1 depicts an illustrative architecture 100 in which techniques for providing the systems and methods disclosed herein may be implemented. The illustrative architecture 100 may include a number of users 102 (utilizing one or more computing devices 104), one or more package delivery system computers 106, a magnetic delivery platform 108, and a drone 110. All of the various components may interact with one another directly and/or over one or more networks 112. For example, in some instances, all of the various components may access, receive from, transmit to, or otherwise interact with one another directly and/or over the networks 112 to facilitate the delivery of a magnetic package 114 from the drone 110 to the magnetic delivery platform 108.

The networks 112 may include any one or a combination of multiple different types of networks, such as cable networks, the Internet, wireless networks, and other private and/or public networks. In some instances, the networks 112 may include Bluetooth, cellular, near-field communication (NFC), Wi-Fi, or Wi-Fi direct. The described techniques may equally apply in instances where the users 102 interact with the various components via a personal computer, over the phone, via a kiosk, or in any other manner. It is also noted that the described techniques may apply in other client/server arrangements (e.g., set-top boxes, etc.), as well as in non-client/server arrangements (e.g., locally stored software applications, etc.).

In certain embodiments, the users 102 may utilize the computing devices 104 to access a user application interface 116 (e.g., an app or website) that may be provided by, created by, or otherwise associated with a package delivery system (such as the system described above) via the networks 112. In some instances, the computing devices 104 may be configured to present or otherwise display the user application interface 116 to the users 102. In some aspects, the user application interface 116 may allow the users 102 to access, receive from, transmit to, or otherwise interact with the package delivery system via the package delivery system computers 106. In addition, the user application interface 116 may allow the users 102 to access, receive from, transmit to, or otherwise interact with, the magnetic delivery platform 108 and/or the drone 110.

The user devices 104 may be any type of computing devices including, but not limited to, desktop personal computers (PCs), laptop PCs, mobile phones, smart phones, personal digital assistants (PDAs), tablet PCs, game consoles, set-top boxes, wearable computers, e-readers, web-enabled TVs, cloud-enabled devices and work stations, and the like. In some instances, each user device 104 may be equipped with one or more processors 118 and a memory 120 to store applications and data, such as a user application 122 that may display the user application interface 116.

The package delivery system computers 106 may be any type of computing devices such as, but not limited to, mobile, desktop, and/or cloud computing devices, such as servers. The package delivery system computers 106 may include one or more servers, perhaps arranged in a cluster, as a server farm, or as individual servers not associated with one another. Other server architectures may also be used to host the package delivery system computers 106. The package delivery system computers 106 may be equipped with one or more processors 124 and a memory 126, which may include an operating system 128 and one or more application programs or services for implementing the features disclosed herein including a drone module 130, a magnetic delivery platform module 132, and/or a database 134.

In some instances, user account data associated with a user 102 may be stored by the package delivery system computers 106 in the database 134. The user account data may include a user profile. For example, the user profile may include personal information associated with the user 102, such as identification information, addresses, magnetic delivery platform information, payment information, user preferences, etc. The user account data may also include information that associates each user 102 with one or more user devices 104 and/or one or more magnetic delivery platforms 108. The users 102 may access his or her account data via the user application interface 116 on the user devices 104 or a website hosted by the package delivery system computers 106.

The magnetic delivery platform 108 may include a computing device (e.g., a controller or the like) equipped with one or more processors 136 and a memory 138. The magnetic delivery platform 108 may also include an actuator 140 and one or more magnets 142, all of which may be in communication with the processors 136 and the memory 138. The magnetic delivery platform 108 also may include a wireless communication transceiver or the like for communicating with the user devices 104, the package delivery system computers 106, and/or the drone 110.

The drone 110 may include a computing device (e.g., a controller or the like) equipped with one or more processors 144 and a memory 146. The drone 110 also may include a wireless communication transceiver or the like for communicating with the various components, such as the user devices 104, the package delivery system computers 106, and/or the magnetic delivery, platforms 108. In some instances, the drone 110 may communicate directly with the magnetic delivery platform 108 using Bluetooth, near-field communication (NFC), Wi-Fi, or Wi-Fi direct, or over a network.

The drone 110 may be configured to transport and deliver the magnetic package 114 to the magnetic delivery platform 108. In some instances, the magnetic package 114 may include a magnetic material 115. The magnetic delivery platform 108 may include a platform body 148 having a landing surface 150. The landing surface 150 of the platform body 148 may be configured to receive the magnetic package 114 thereon. For example, the drone 110 may deliver and release the magnetic package 114 on, at, or near the landing surface 150 of the platform body 148.

In some instances, the magnets 142 may be disposed on or within the platform body 148. In other instances, the magnets 142 may be disposed below the platform body 148. In one example embodiment, the magnets 142 may be disposed about the landing surface 150 of the platform body 148. In some instances, the magnets 142 may be configured to attract and secure the magnetic package 114 delivered by the drone 110 to the landing surface 150 of the platform body 148. For example, the drone 110 may deliver and release the magnetic package 114 on, at, or near the landing surface 150 of the platform body 148, and the magnets 142 disposed about the landing surface 150 of the platform body 148 may be activated to magnetically attract the magnetic package 114 to the landing surface 150 of the platform body 148.

In certain embodiments, the magnets 142 may be configured to be activated to magnetically attract (or repel) the magnetic package 114 to a specific location on the landing surface 150 of the platform body 148. For example, the platform body 148 may include one or more sensors capable of determining the location of the magnetic package 114 on the landing surface 150 of the platform body 148. The sensors may be IR sensors, pressure sensors, electromagnetic sensors, video sensors, light sensors, or the like. Any suitable sensor may be used. In other instances, the magnets 142 may be configured to be activated to magnetically attract (or repel) the magnetic package 114 to a location off of or next to the landing surface 150 of the platform body 148.

The actuator 140 may be in mechanical communication with the platform body 148. In this manner, the actuator 140 may be configured to move the platform body 148 between a deployed position and a stowed position, as discussed below. For example, the actuator 140 may be configured to lower the platform body from the stowed position to the deployed position in order to receive the magnetic package 114 on the landing surface 150 of the platform body 148. After the magnetic package 114 has been delivered, the actuator 140 may be configured to move the platform body 148 back to the stowed position.

In certain embodiments, the drone module 130 and the magnetic delivery platform module 132 may be configured to facilitate delivery of the magnetic package 114 from the drone 110 to the landing surface 150 of the platform body 148. For example, the drone module 130 may instruct the drone 110 to transport the magnetic package 114 to the magnetic delivery platform 108. In some instances, the drone module 130 may provide the drone 110 with navigation instructions to the magnetic delivery platform 108. The magnetic delivery platform module 132 may be configured to activate the magnetic delivery platform 108. For example, the magnetic delivery platform module 132 may instruct the platform body 148 to move from the stowed position to the deployed position. In addition, the magnetic delivery platform module 132 may be configured to activate one or more of the magnets 142 of the magnetic delivery platform 108 to attract the magnetic package 114 to the landing surface 150 of the platform body 148. The magnetic delivery platform module 132 also may be configured to attract (or repel) the magnetic package 114 to a specific location on the magnetic delivery platform 108 or to direct the magnetic package 114 to a location off of the magnetic delivery platform 108.

In some instances, the user 102 may interact with the user application interface 116 to provide personal information to the package delivery system computers 106, to receive a message that a package has been delivered, to request package information, to request a transfer of his or her package, to move his or her package about the landing surface 150 of the platform body 148, onto the floor, into a container, into a chute, into a storage area, or elsewhere, to confirm the package has been delivered, and/or to lock or unlock access to his or her package (e.g., by entering a pin into the user device 104). The user 102 may interact with the user application interface 116 to communicate with the package delivery system computers 106, the drone 110, and/or the magnetic delivery platform 108. For example, the user 102 may move the platform body 148 between the stowed position and the deployed position, move the magnetic package 114 to different locations on the landing surface 150 of the platform body 148 by activating one or more of the magnets 142, or move the magnetic package 114 off of the platform body 148 by activating one or more of the magnets 142.

For example, as depicted in FIG. 2, one or more of the magnets 142 may be energized to move (as depicted by the dashed arrow 154) the magnetic package 114 off of the landing surface 150 of the platform body 148 and into a container 152 disposed adjacent to the platform body 148. In some instances, the container 152 may be a secured lock box or the like. The container 152 may be any suitable size, shape, or configuration. The container 152 may be used as a storage area for the magnetic package 114, which may enable the platform body 148 to move back to the stowed position once the magnetic package is removed from the landing surface 150 of the platform body 148.

In other instances, as depicted in FIG. 3, one or more of the magnets 142 may be energized to move (as depicted by the dashed arrow 156) the magnetic package 114 off of the landing surface 150 of the platform body 148 and into a chute 158 disposed adjacent to the platform body 148. The chute 148 may direct the magnetic package 114 to a central deposit for storage. In some instances, the chute 158 may direct the magnetic package to a conveyer belt 160, which may direct the magnetic package to a storage area.

Figure 4:
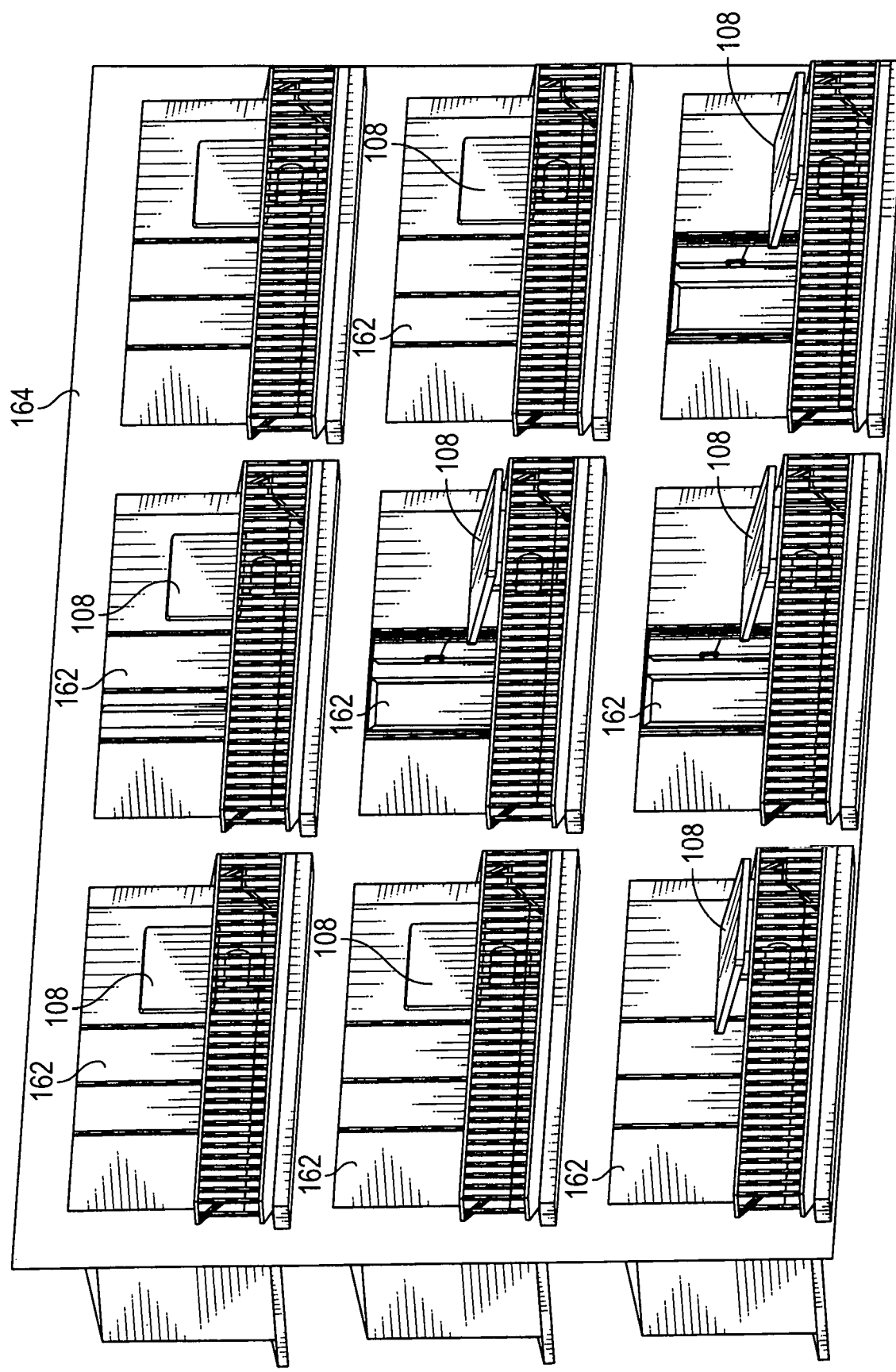
FIG. 4 depicts a number of magnetic delivery platforms disposed about a number of balconies of a residential building in accordance with one or more embodiments of the disclosure.

The magnetic delivery platform 108 may be used in high-density residential communities. For example, as depicted in FIG. 4, a plurality of the magnetic delivery platforms 108 may be associated with a plurality of balconies 162 of an apartment/condominium building 164. That is, the magnetic delivery platforms 108 may be attached to the walls 166 of the balconies 162. In some instances, a residential building may include a single magnetic delivery platform 108, which may receive all of the deliveries to the residential building.

Figure 5:
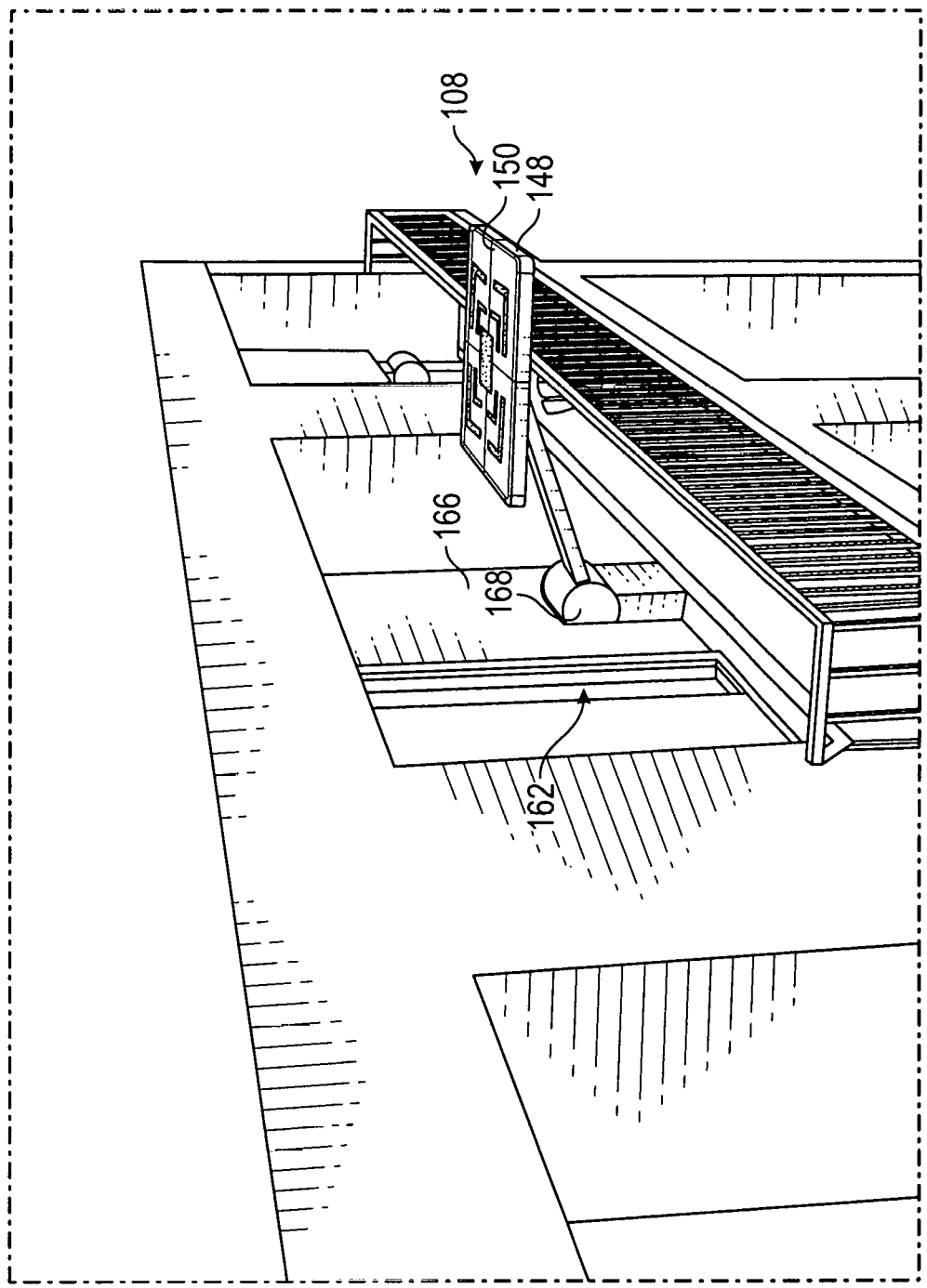
FIG. 5 depicts a magnetic delivery platform disposed on a balcony of a residential building in accordance with one or more embodiments of the disclosure.

The magnetic delivery platforms 108 may be arranged in a stowed position (e.g., substantially vertical) or in a deployed position (e.g., substantially horizontal). In this manner, the magnetic delivery platforms 108 may include a pivot joint 168 (as depicted in FIG. 5) in which the platform body 148 pivots between the stowed position and the deployed position. The actuator 140 may pivot the platform body 148 between the stowed position and the deployed position via the pivot joint 168. The magnetic delivery platform 108 may be attached to the wall 166 of the balcony 162 in any suitable manner.

Figure 6:
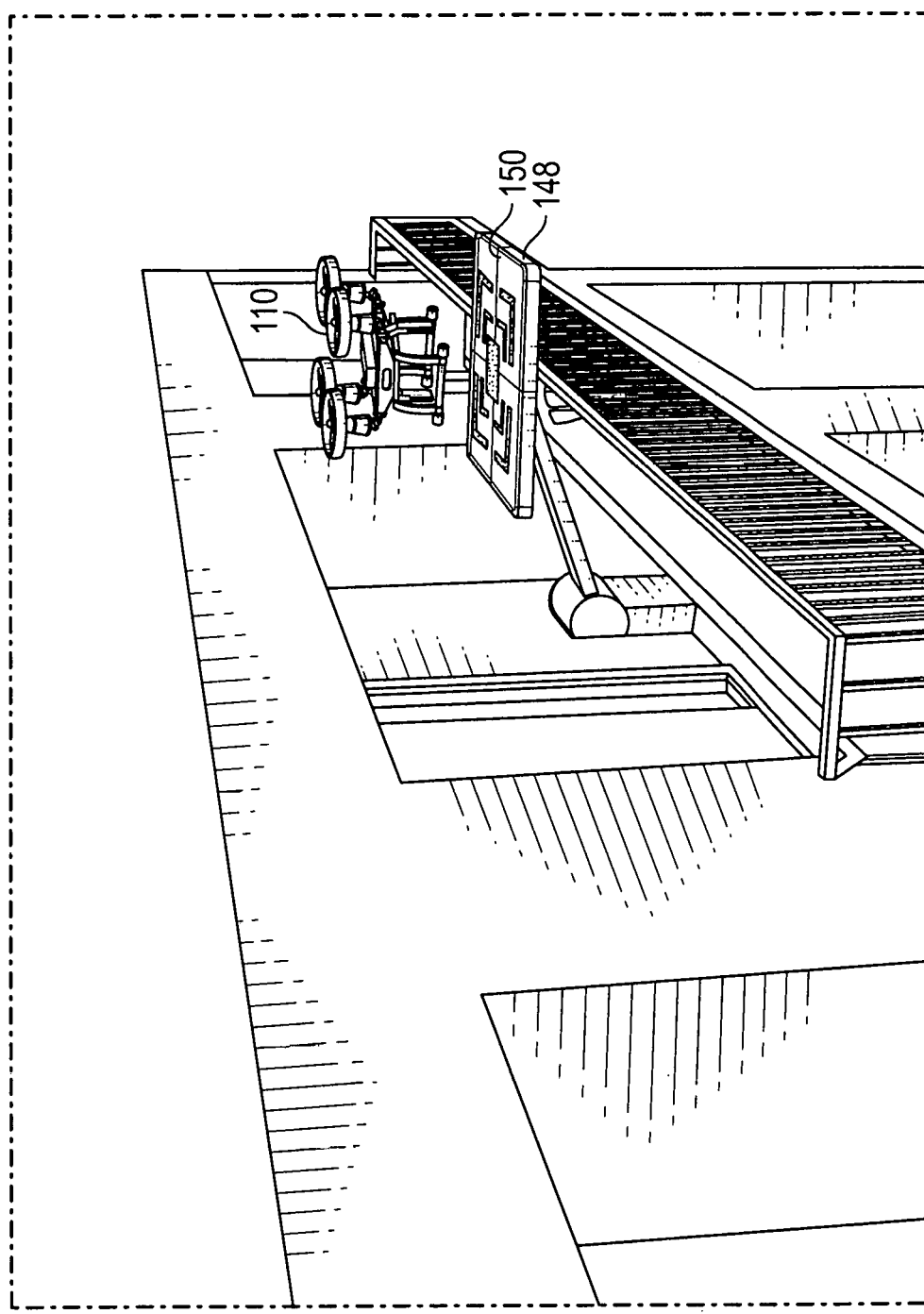
FIG. 6 depicts a magnetic delivery platform disposed on a balcony of a residential building in accordance with one or more embodiments of the disclosure.
Figure 7:
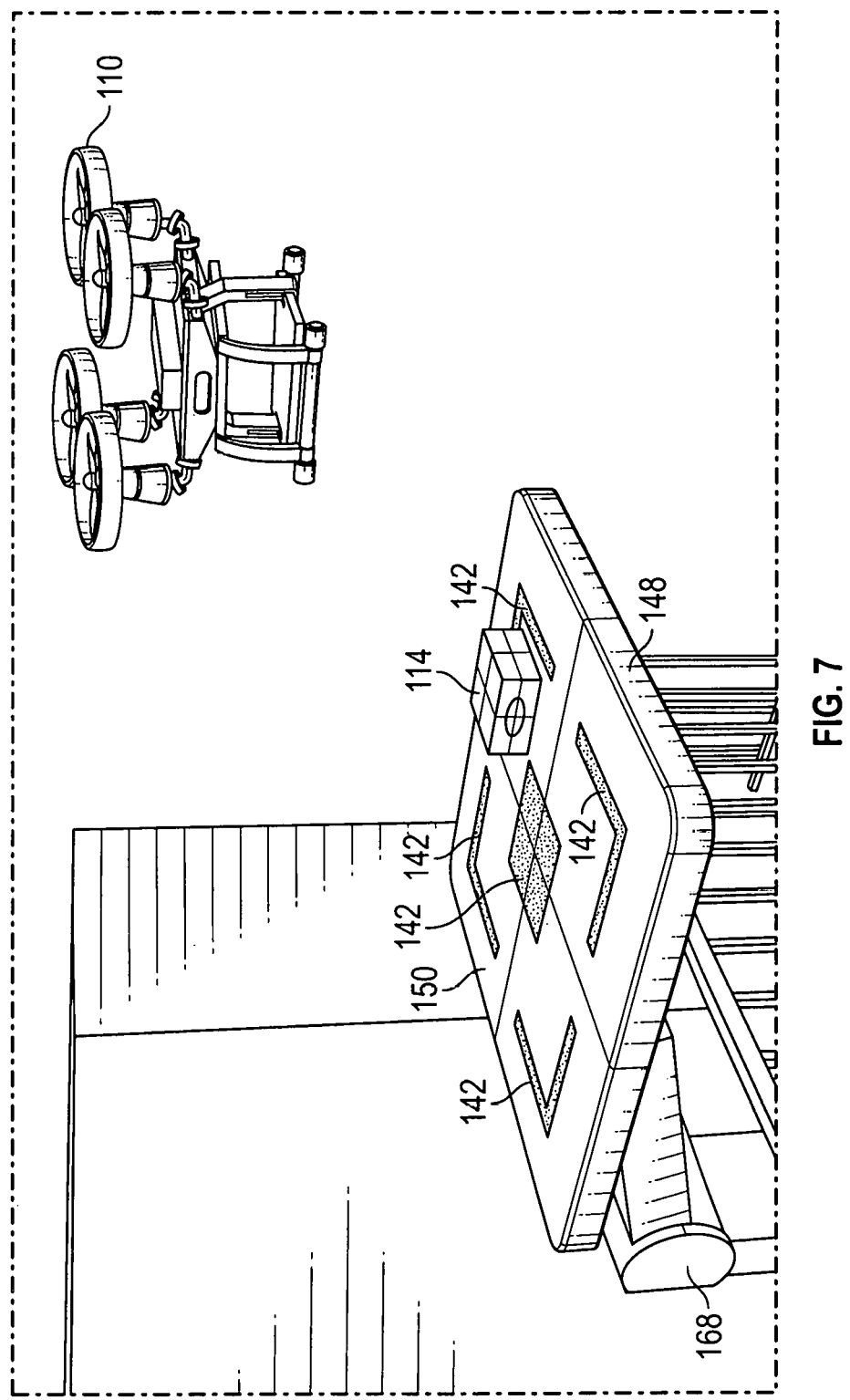
FIG. 7 depicts a magnetic delivery platform disposed on a balcony of a residential building in accordance with one or more embodiments of the disclosure.

As depicted in FIG. 5, the magnetic delivery platform 108 may be positioned in the deployed position. For example, the drone 110 may instruct the magnetic delivery platform 108 that it intends to deliver a magnetic package 114 to the magnetic delivery platform 108. In this manner, the actuator 140 may move the platform body 148 from the stowed position to the deployed position. Once the platform body 148 is in the deployed position, as depicted in FIG. 6, the drone 110 may approach the landing surface 150 of the magnetic delivery platform 108. The drone 110 may deliver and release the magnetic package 114 on, at, or near the landing surface 150 of the platform body 148, and the magnets 142 disposed about the landing surface 150 of the platform body 148 may be activated to attract the magnetic package 114 to the landing surface 150 of the platform body 148. As depicted in FIG. 7, after the drone 110 has delivered the magnetic package 114 to the magnetic delivery platform 108, the drone 110 may fly away, and the magnets 142 may be activated in various sequences to secure the magnetic package 114 to the landing surface 150 of the platform body 148.

Figure 8:
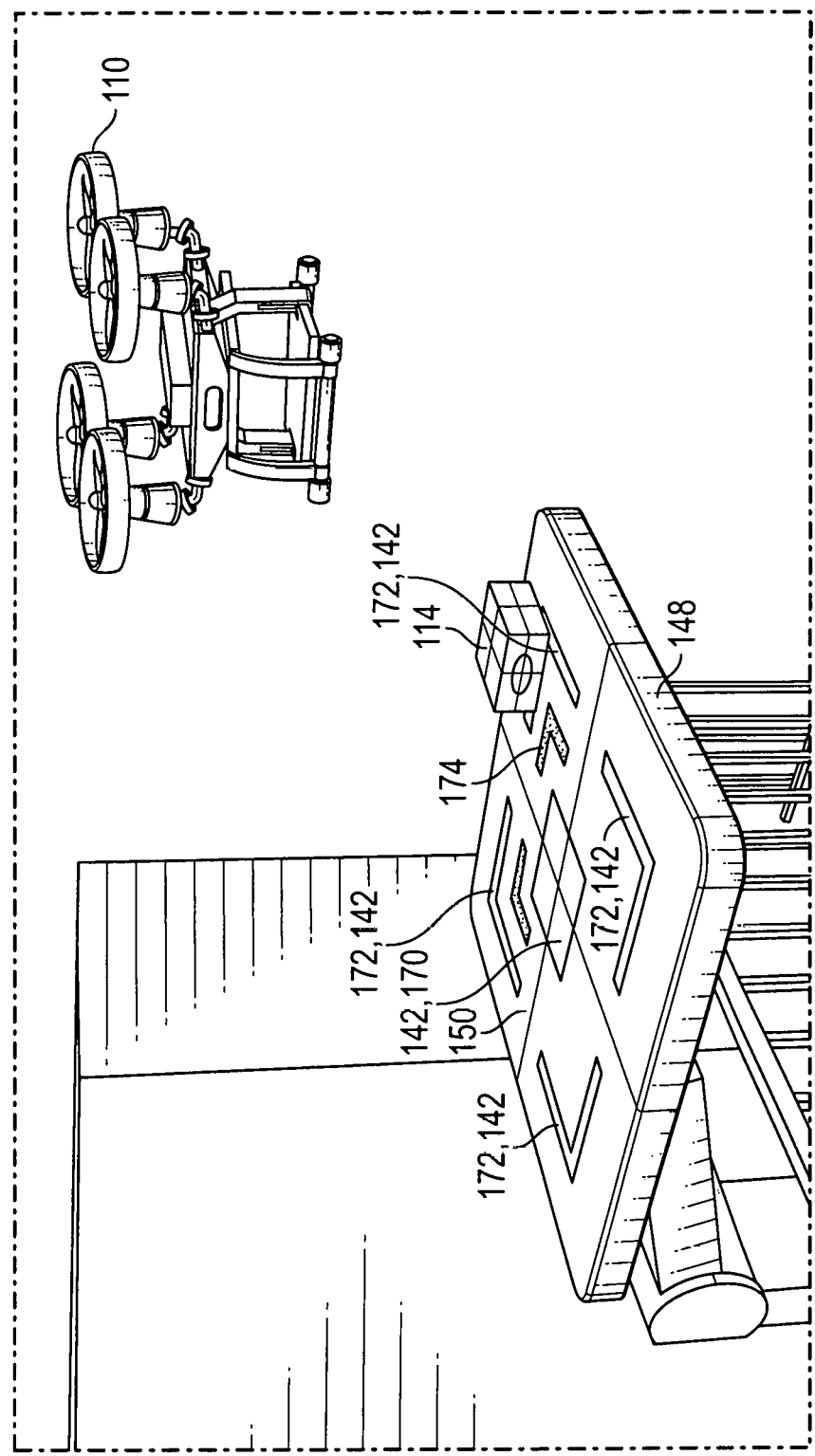
FIG. 8 depicts a magnetic delivery platform disposed on a balcony of a residential building in accordance with one or more embodiments of the disclosure.

The magnets 142 may be disposed at different locations about the landing surface 150 of the platform body 148. In one example embodiment, each of the magnets 142 may be associated with a specific location or area of the landing surface 150 of the platform body 148. For example, one or more magnets 142 may be associated with a central portion 170 (as depicted in FIG. 8) of the landing surface 150 of the platform body 148, and each corner 172 of the landing surface 150 of the platform body may include at least one magnet 142. The magnets 142 disposed about the corners of the landing surface 150 may surround the central magnet 142.

As depicted in FIGS. 8-12, one or more of the magnets 142 may be energized to move the magnetic package 114 to a specific location on the landing surface 150 of the platform body 148. For example, if the magnetic package 114 is located on an outer edge of the landing surface 150, as depicted in FIG. 8, one or more of the magnets 142 may be energized to magnetically attract (or repel) the magnetic package 114 to the center portion 170 of the landing surface 150 of the platform body 148.

Figure 9:
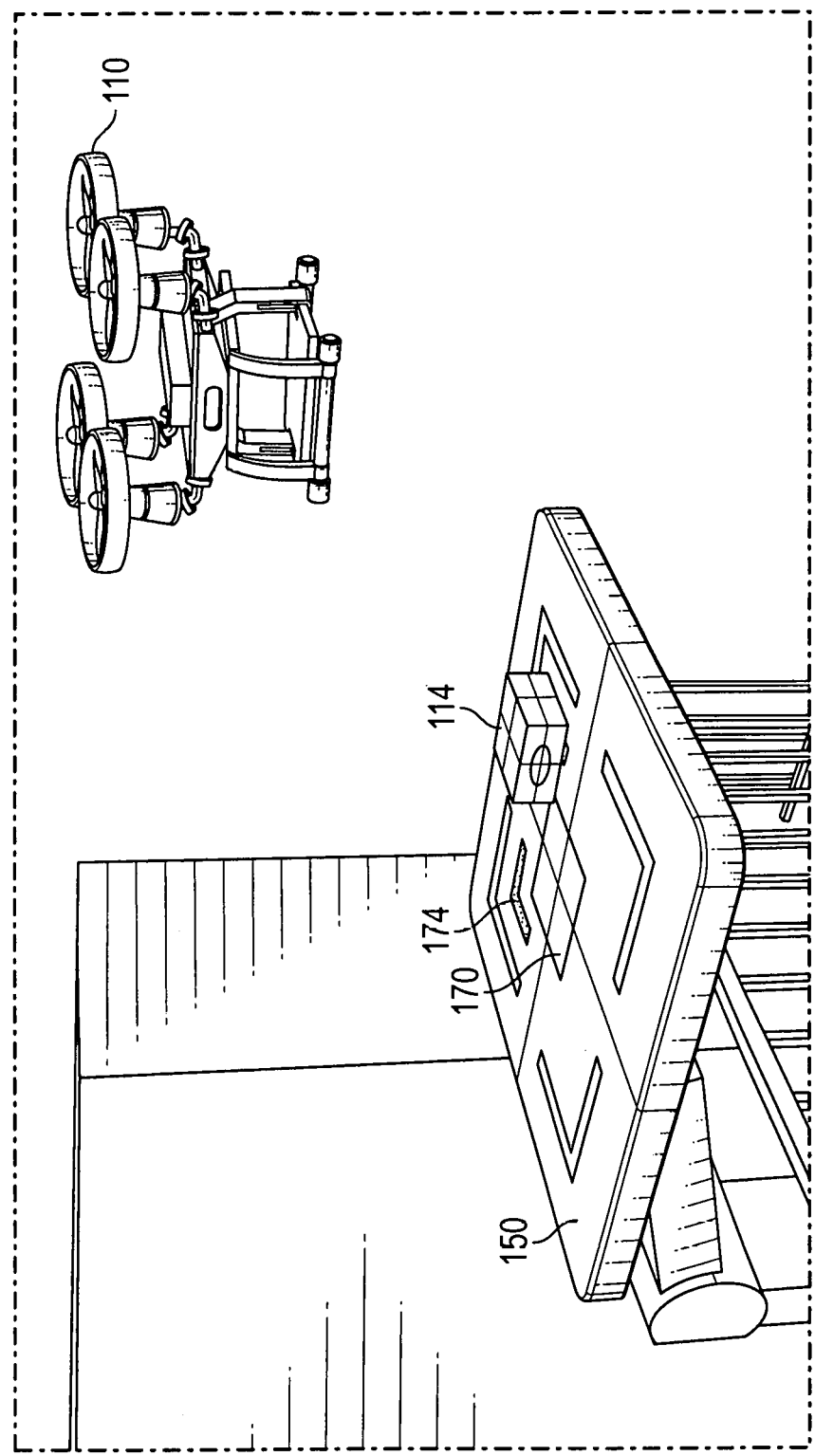
FIG. 9 depicts a magnetic delivery platform disposed on a balcony of a residential building in accordance with one or more embodiments of the disclosure.
Figure 10:
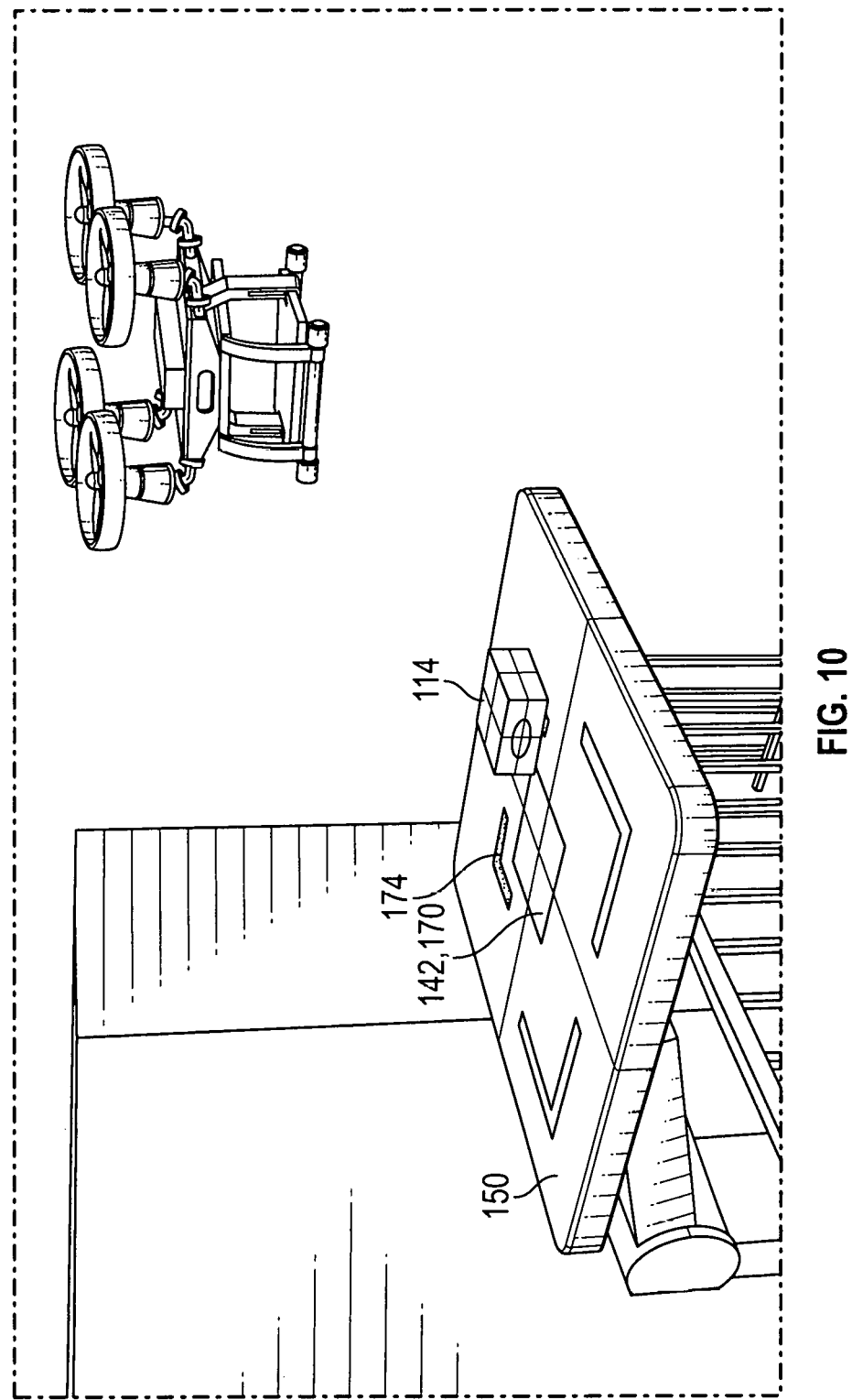
FIG. 10 depicts a magnetic delivery platform disposed on a balcony of a residential building in accordance with one or more embodiments of the disclosure.
Figure 11:
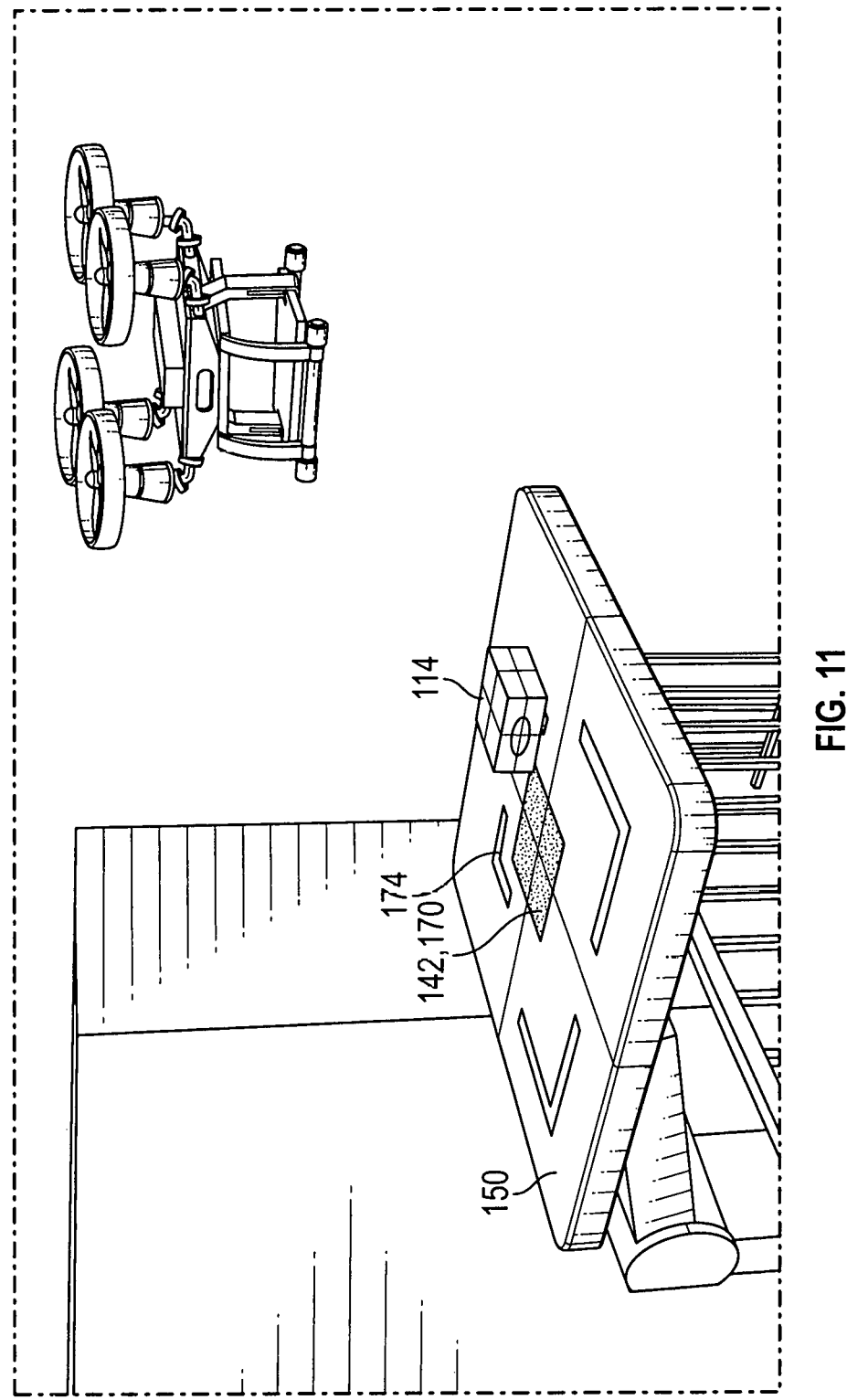
FIG. 11 depicts a magnetic delivery platform disposed on a balcony of a residential building in accordance with one or more embodiments of the disclosure.
Figure 12:
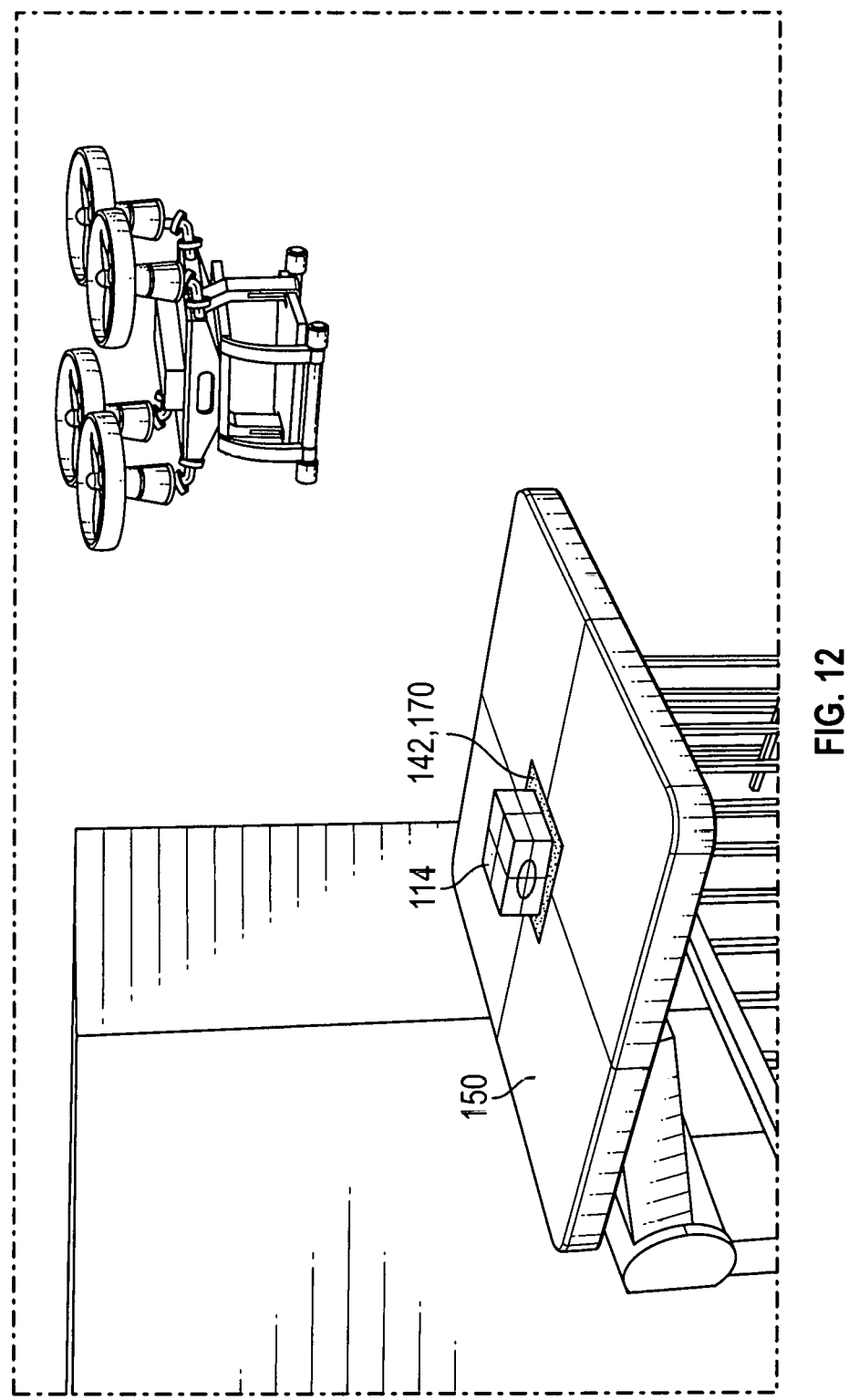
FIG. 12 depicts a magnetic delivery platform disposed on a balcony of a residential building in accordance with one or more embodiments of the disclosure.

In one example embodiment, additional magnets 174 may be disposed between the magnets 142 located at the central location 170 and the corners 172 of the landing surface 150. In some instances, the additional magnets 174 may be activated to move the magnetic package 114 to the center portion 170 of the landing surface 150. When the additional magnets 174 are activated, as depicted in FIGS. 9 and 10, the magnets 142 located in the corners 172 of the landing surface 150 may be deactivated. This may cause the magnetic package 114 to move inward towards the central location 170 of the landing surface 150. In some instances, the magnet 142 located at the central portion 170 of the landing surface 150 may be activated to move the magnetic package 114 to the center portion 170 of the landing surface 150. When the magnet 142 located at the central portion 170 of the landing surface 150 is activated, as depicted in FIGS. 11 and 12, the additional magnets 174 may be deactivated. This may cause the magnetic package 114 to move inward towards the central location 170 of the landing surface 150.

Figure 13:
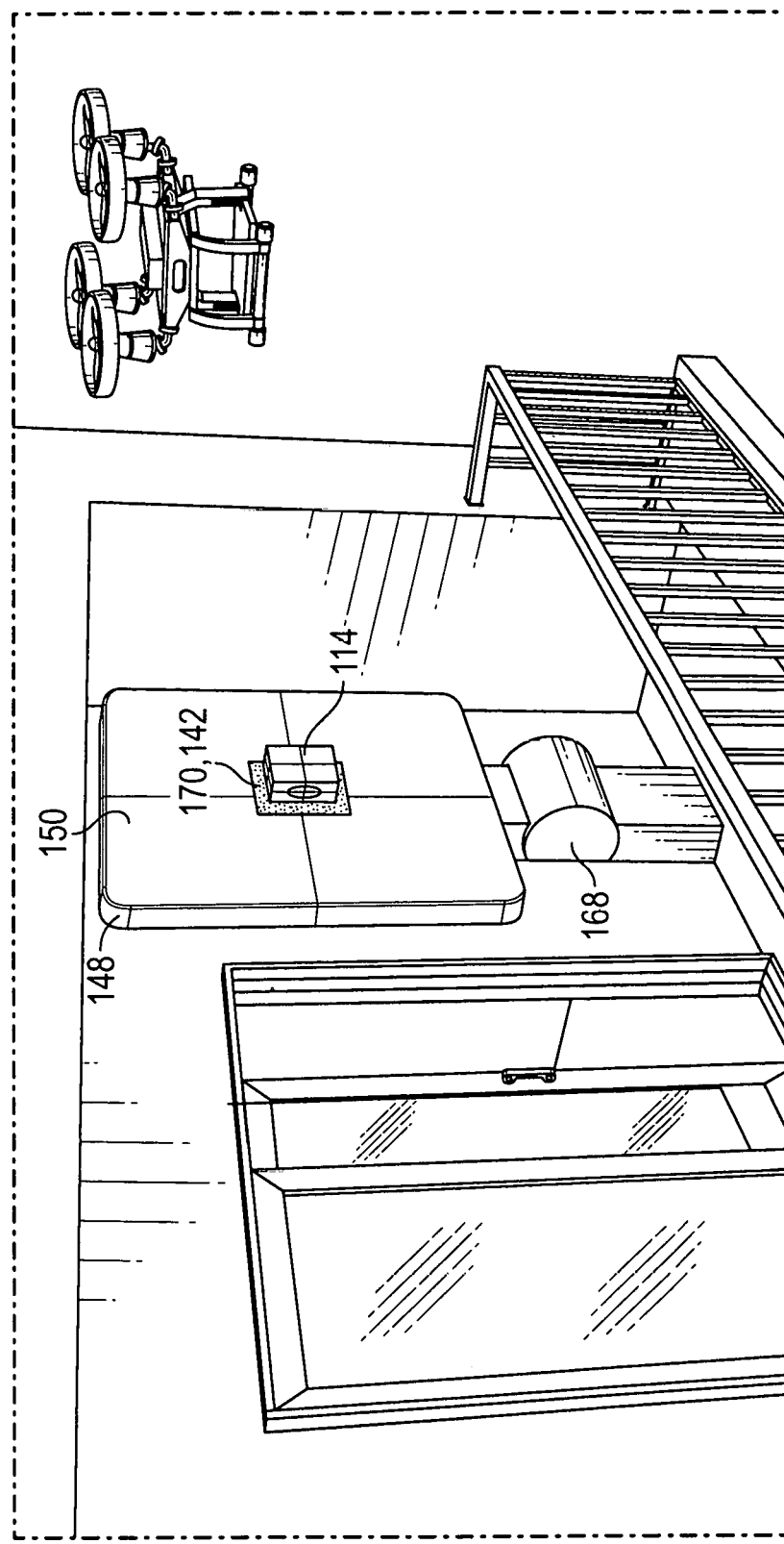
FIG. 13 depicts a magnetic delivery platform disposed on a balcony of a residential building in accordance with one or more embodiments of the disclosure.
Figure 14:
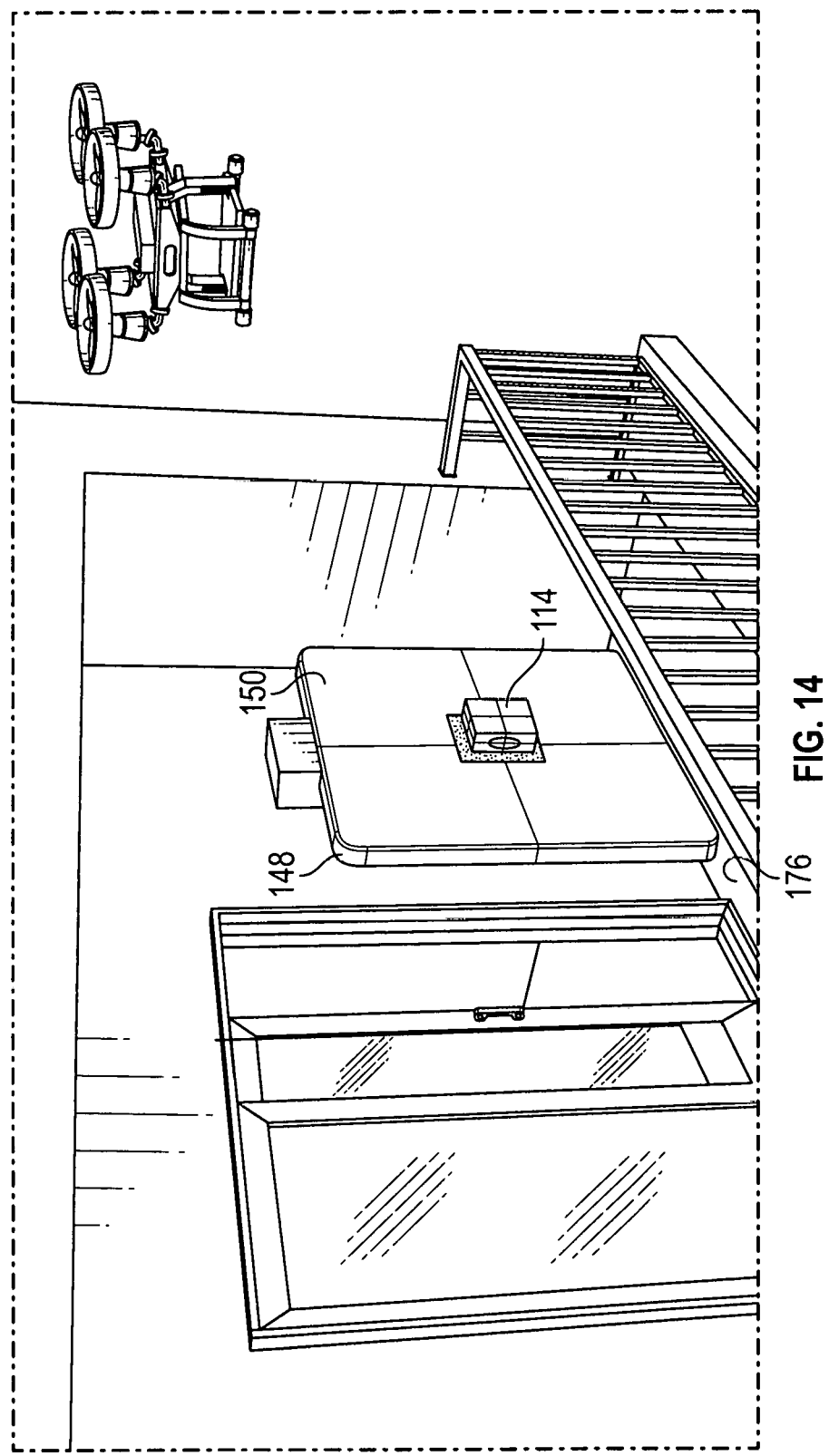
FIG. 14 depicts a magnetic delivery platform disposed on a balcony of a residential building in accordance with one or more embodiments of the disclosure.

In some instances, once the magnetic package 114 is located at the central location 170, the platform body 148 may be moved from the deployed position, as depicted in FIG. 12, to the stowed position, as depicted in FIG. 13. For example, as depicted in FIGS. 13-18, the platform body 148 may be moved to the stowed position and lowered to the floor 176 (as depicted in FIG. 14). Next, one or more the magnets 142 (or the additional magnets 174) may be energized to attract (or repel) the magnetic package 114 to move ("crawl") the magnetic package along the vertically oriented landing surface 150 and on to the floor 176. In other instances, the magnetic package 114 may be moved into a storage area, a container, or a chute disposed adjacent to the magnetic delivery platform 108.

Figure 15:
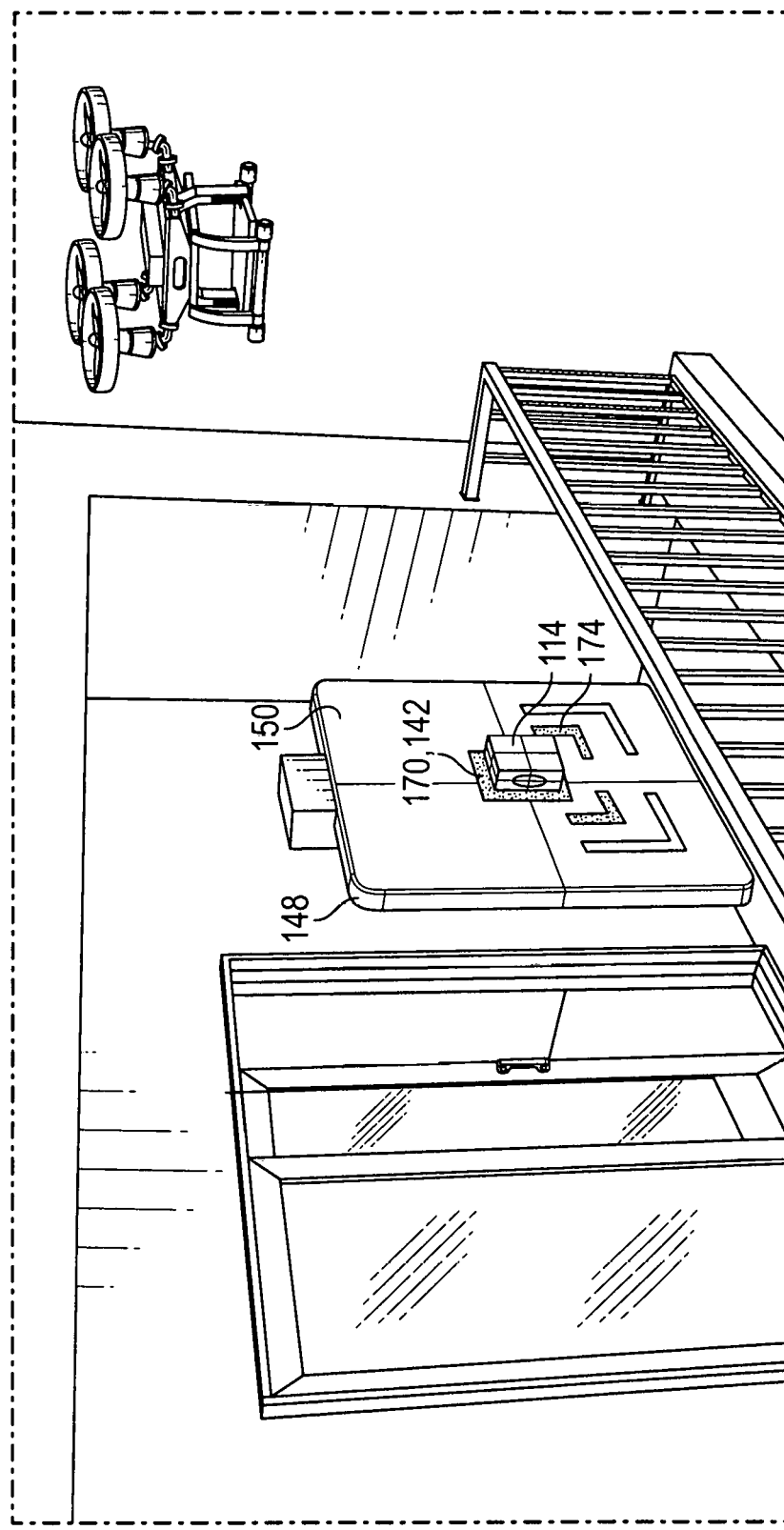
FIG. 15 depicts a magnetic delivery platform disposed on a balcony of a residential building in accordance with one or more embodiments of the disclosure.
Figure 16:
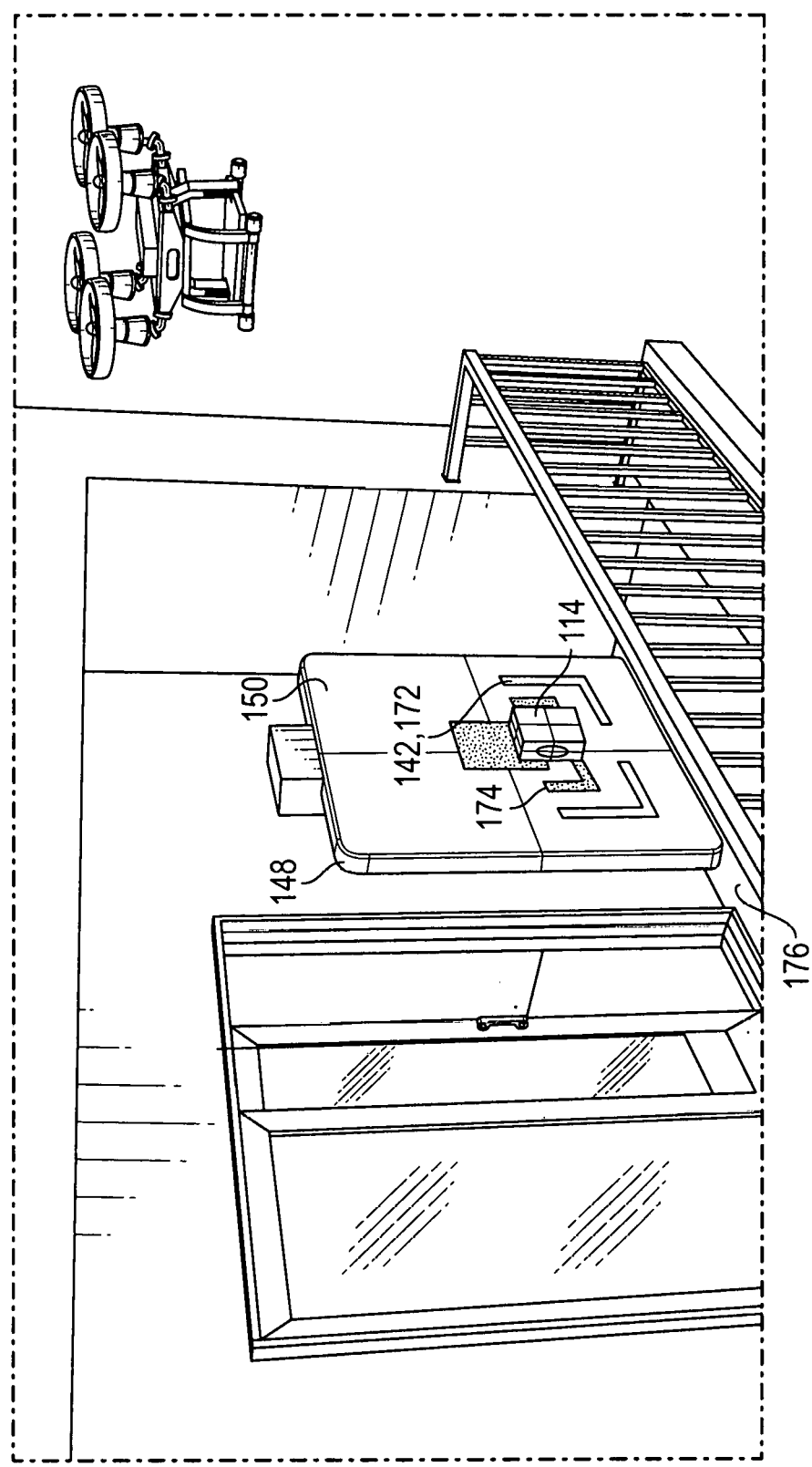
FIG. 16 depicts a magnetic delivery platform disposed on a balcony of a residential building in accordance with one or more embodiments of the disclosure.
Figure 17:
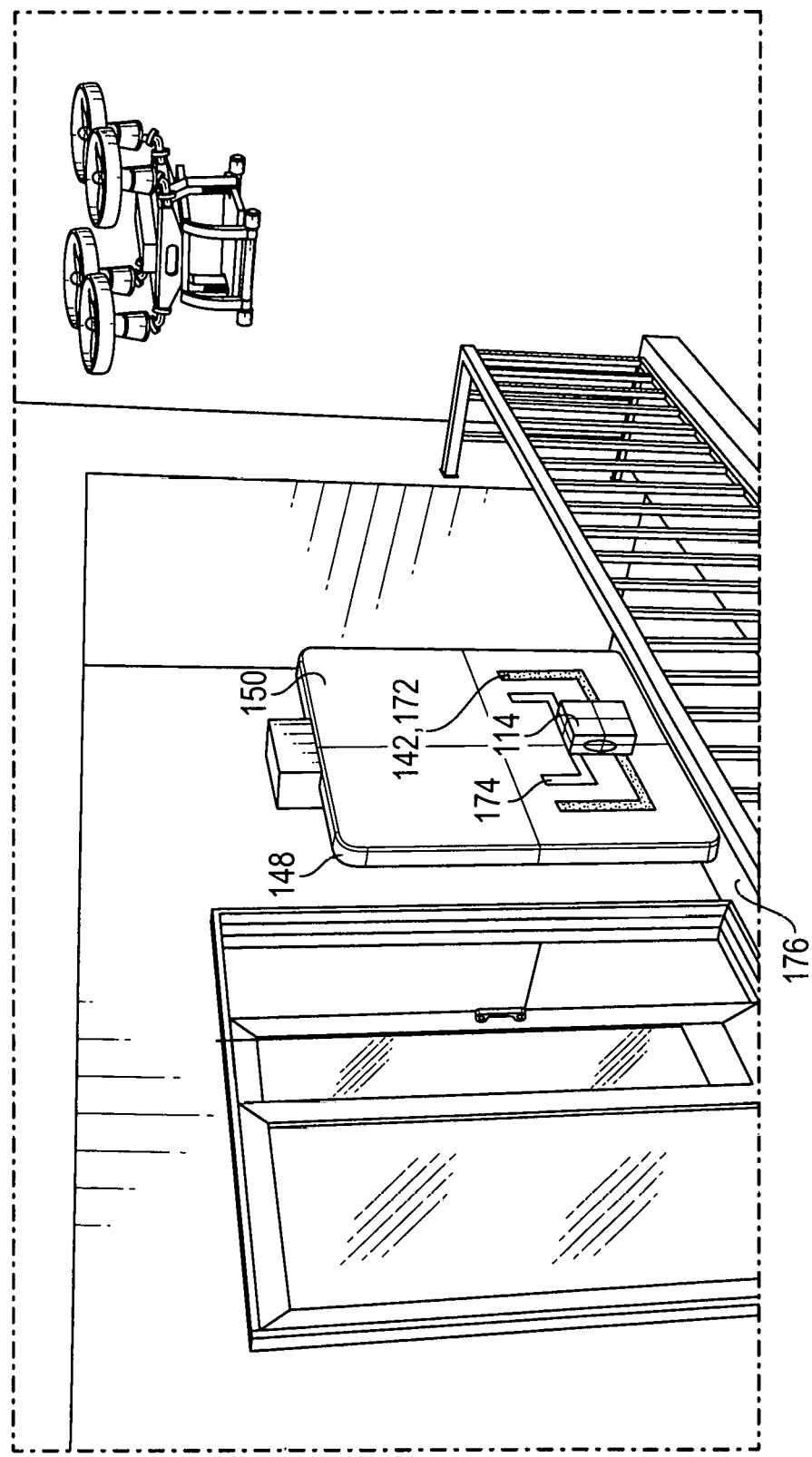
FIG. 17 depicts a magnetic delivery platform disposed on a balcony of a residential building in accordance with one or more embodiments of the disclosure.
Figure 18:
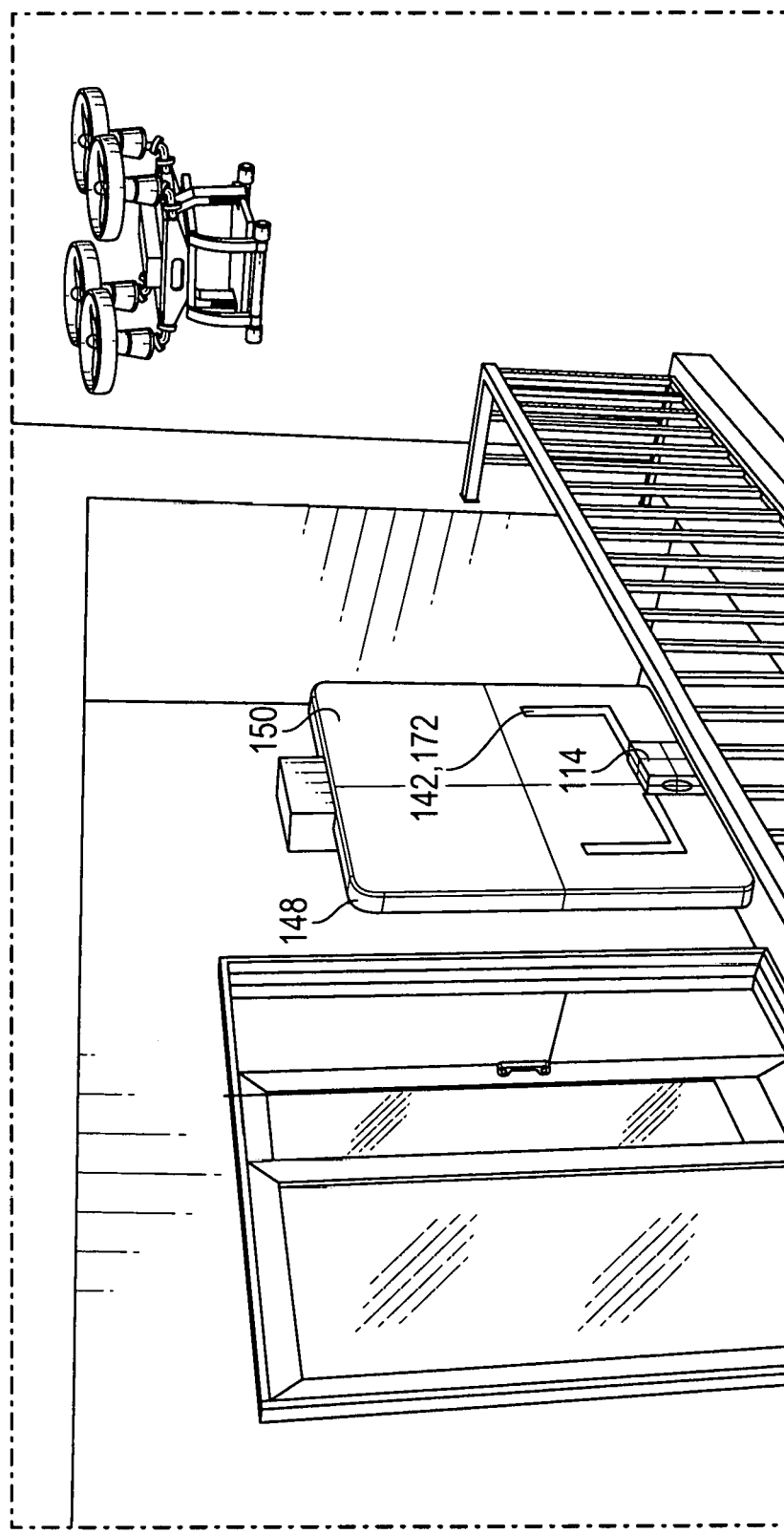
FIG. 18 depicts a magnetic delivery platform disposed on a balcony of a residential building in accordance with one or more embodiments of the disclosure.

In some instances, the additional magnets 174 may be activated to move the magnetic package 114 away from the center portion 170 of the landing surface 150. When the additional magnets 174 are activated, as depicted in FIGS. 15 and 16, the magnets 142 located at the central portion 170 of the landing surface 150 may be deactivated. This may cause the magnetic package 114 to be lowered downward towards the floor 176. In some instances, the magnet 142 located in the corners 172 of the landing surface 150 may be activated to move the magnetic package 114 closer to the floor 176. When the magnet 142 located in the corners 172 of the landing surface 150 are activated, as depicted in FIG. 17, the additional magnets 174 may be deactivated. This may cause the magnetic package 114 to be lowered downward towards the floor 176. Lastly, the magnet 142 located in the corners 172 of the landing surface 150 may be deactivated, and the magnetic package 114 may be placed on the floor 176, as depicted in FIG. 18.

Illustrative Processes

Figure 21:
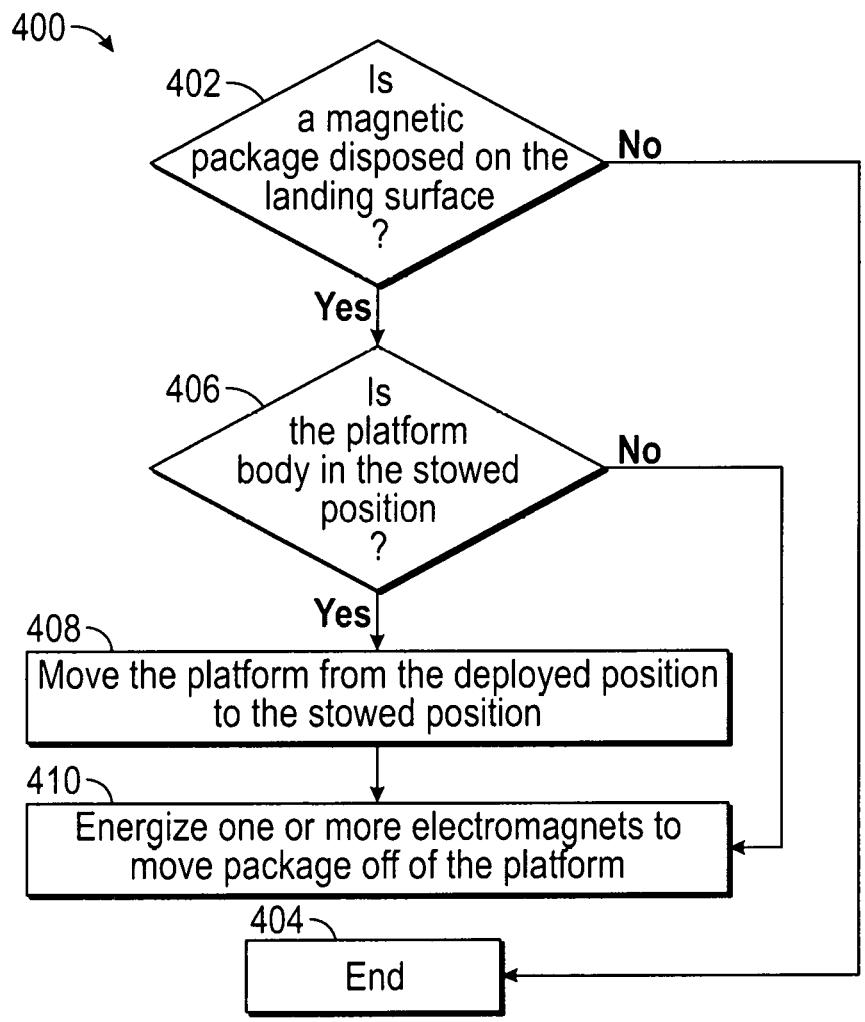
FIG. 21 depicts a flow diagram for delivering and securing a magnetic package delivered from a drone onto a magnetic delivery platform in accordance with one or more embodiments of the disclosure.

FIGS. 19-21 illustrate example flow diagrams showing processes for delivering and securing a magnetic package delivered from a drone onto a magnetic delivery platform, as described above. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The processes may, but need not, be implemented by a computing device operated by a package delivery system, such as the package delivery system computers 106. FIG. 19 illustrates a flow diagram showing the process 200 for delivering and securing a magnetic package 114 delivered from a drone 110 onto a magnetic delivery platform 108, as described above. In some aspects, the process 200 may begin at block 202 by monitoring if a signal has been received by the magnetic delivery platform 108 from a drone 110 delivering a magnetic package 114. For example, the magnetic delivery platform 108 may include a transceiver or the like capable of commutating with a drone 110. In this manner, the drone 110 may be capable of communicating with the magnetic delivery platform 108 using, for example, Bluetooth, near-field communication (NFC), Wi-Fi or Wi-Fi direct, or over a wireless network. That is, the drone 110 may communicate directly with the magnetic delivery platform 108 or over a wireless network.

If a signal is not received from the drone 110, then the magnetic delivery platform 108 may continue to monitor for a signal. If a signal is received from the drone 110, then a determination may be made if the magnetic delivery platform 108 is in the stowed position, at block 204. For example, the platform body 148 of the magnetic delivery platform 108 may include a stowed position and a deployed position. In this manner, when not in use, the platform body 148 may be stowed in the stowed position to limit its footprint. For example, the platform body 148 may be positioned in a vertical configuration when stowed. On the other hand, when a magnetic package 114 is to be delivered by the drone 110, the platform body 148 may be deployed from the stowed position to the deployed position. In some instances, the deployed position may include the platform body 148 being positioned in a horizontal configuration. In this manner, if the platform body 148 is in the stowed position, then the platform body 148 may be deployed from the stowed position to the deployed position, at block 206, in order to receive the magnetic package 114 on the landing surface 150 of the platform body 148.

At block 208, once the platform body 148 is in the deployed position, one or more magnets 142 (e.g., electromagnetics) disposed about the platform body 148 may be energized to receive and magnetically secure the magnetic package 114 to the landing surface 150 of the platform body 148. That is, the magnets 142 may be configured to attract and secure the magnetic package 114 delivered by the drone 110 to the landing surface 150 of the platform body 148. For example, the drone 110 may deliver and release the magnetic package 114 on, at, or near the landing surface 150 of the platform body 148, and the magnets 142 disposed about the landing surface 150 of the platform body 148 may be activated to attract the magnetic package 114 to the landing surface 150 of the platform body 148. The magnets 142 disposed about the landing surface 150 of the platform body 148 may also be activated to secure the magnetic package 114 on the landing surface 150 of the platform body 148 after the magnetic package 114 has been delivered by the drone 110.

FIG. 20 illustrates a flow diagram showing the process 300 for delivering and securing a magnetic package 114 delivered from a drone 110 onto a magnetic delivery platform 108, as described above. At block 302, the process 300 may begin by determining if a magnetic package 114 is located on the landing surface 150 of the platform body 148. For example, as noted above, a drone 110 may deliver a magnetic package 114 to the magnetic delivery platform 108. If a magnetic package 114 is not present on the landing surface 150 of the platform body 148, the process 300 may end at block 304.

If it is determined that a magnetic package 114 is disposed on the landing surface 150 of the platform body 148, then a determination may be made if the magnetic package 114 is in the correct location on the landing surface 150 of the platform body 148 at block 306. If the magnetic package 114 is in the correct location, then the process 300 may end at block 304. If the magnetic package 114 is not located in the correct location on the landing surface 150 of the platform body 148, then one or more of the electromagnets 142 may be energized to move the magnetic package 114 to a specific location on the landing surface 150 of the platform body 148 at block 308. For example, if the magnetic package 114 is located on an outer edge of the landing surface 150 of the platform body 148, one or more the electromagnets 142 may be energized to attract (or repel) the magnetic package 114 to a center portion 170 of the landing surface 150 of the platform body 148. Any number of the electromagnets 142 may be energized to move the magnetic package 114 to any location about the landing surface 150 of the platform body 148.

FIG. 21 illustrates a flow diagram showing the process 400 for delivering and securing a magnetic package 114 delivered from a drone 110 onto a magnetic delivery platform 108, as described above. At block 402, the process 400 may begin by determining if a magnetic package 114 is located on the landing surface 150 of the platform body 148. For example, as noted above, a drone 110 may deliver a magnetic package 114 to the magnetic delivery platform 108. If a magnetic package 114 is not present on the landing surface 150 of the platform body 148, the process 400 may end at block 404. If it is determined that a magnetic package 114 is disposed on the landing surface 150 of the platform body 148, then a determination may be made if the platform body 148 is in the stowed position at block 406. For example, the platform body 148 of the magnetic delivery platform 108 may include a stowed position and a deployed position. The platform body 148 may be positioned in a vertical configuration when in the stowed position. At block 408, if the platform body 148 is not in the stowed position (i.e., the platform body 148 is in the deployed position), then the platform body 148 may be moved from the deployed position to the stowed position. Once in the stowed position, the magnetic package 110 may be moved off of the platform body 148. For example, at block 410, one or more of the electromagnets 142 may be energized to attract (or repel) the magnetic package 114 to move (or "crawl") the magnetic package 114 along the landing surface 150 of the platform body 148 and onto the floor 176 or into a storage area, a container, or a chute disposed adjacent to the magnetic delivery platform 108.

Examples

In some instances, the following examples may be implemented together or separately by the systems and methods described herein.

Example 1 may include a package delivery platform configured to receive a package from a drone, the package including magnetic material, the package delivery platform comprising: a platform body; one or more magnets disposed about the platform body; and a controller configured to cause the one or more magnets to energize in order to secure the package to the platform body.

Example 2 may include the package delivery platform of example 1 and/or some other example herein, wherein the one or more magnets comprise one or more electromagnets.

Example 3 may include the package delivery platform of example 2 and/or some other example herein, wherein the one or more electromagnets are divided into a plurality of sections about the platform body.

Example 4 may include the package delivery platform of example 2 and/or some other example herein, wherein the controller is configured to cause the one or more electromagnets to energize and/or de-energize to move the package to a first location on the platform body.

Example 5 may include the package delivery platform of example 4 and/or some other example herein, wherein the platform body comprises a first position and a second position, and wherein the controller is configured to cause the platform body to move from the second position to the first position when the package is at the first location on the platform body.

Example 6 may include the package delivery platform of example 5 and/or some other example herein, wherein the controller is configured to cause the one or more electromagnets to selectively energize and/or de-energize to move the package to a second location off of the platform body when the platform is in the first position.

Example 7 may include the package delivery platform of example 5 and/or some other example herein, wherein the controller is configured to cause the one or more electromagnets to selectively energize and/or de-energize to move the package to a second location off of the platform body and into a container when the platform is in the first position.

Example 8 may include the package delivery platform of example 5 and/or some other example herein, wherein the controller is configured to cause the one or more electromagnets to selectively energize and/or de-energize to move the package to a second location off of the platform body and into a storage area when the platform is in the first position.

Example 9 may include the package delivery platform of example 1 and/or some other example herein, further comprising a transceiver configured to communicate with the drone.

Example 10 may include the package delivery platform of example 9 and/or some other example herein, wherein the platform body comprises a first position and a second position, and wherein, upon receiving an indication from the drone, the platform body is configured to move from the first position to the second position to receive the package from the drone.

Example 11 may include the package delivery platform of example 10 and/or some other example herein, wherein when in the second position, the platform body is in a horizontal configuration.

Example 12 may include a system configured to receive a package from a drone, the package including magnetic material, the system comprising: a package delivery platform comprising a platform body including at least one electromagnet; at least one memory that stores computer-executable instructions; and at least one processor configured to access the at least one memory, wherein the at least one processor is configured to execute the computer-executable instructions to: determine a communication from at least one of the drone or a system associated with the drone; and cause, based on the communication from the drone, the at least one electromagnet to energize to secure the package to the platform body.

Example 13 may include the system of example 12 and/or some other example herein, wherein the at least one processor is further configured to execute the computer-executable instructions to cause the at least one electromagnet to energize to move the package to a specific location on the platform body.

Example 14 may include the system of example 12 and/or some other example herein, wherein the at least one processor is further configured to execute the computer-executable instructions to cause the at least one electromagnet to energize to move the package off of the platform body.

Example 15 may include the system of example 12 and/or some other example herein, wherein the at least one processor is further configured to execute the computer-executable instructions to cause, based on the communication from the drone, the package delivery platform to move from a first position to a second position.

Example 16 may include a method for receiving a package from a drone, the package including magnetic material, the method comprising: receiving a communication from the drone or a system associated with the drone; and energizing, based on the communication, at least one electromagnet of a package delivery platform to secure the package to a platform body of the package delivery platform.

Example 17 may include the method of example 16 and/or some other example herein, further comprising energizing the at least one electromagnet to move the package to a location on the platform body.

Example 18 may include the method of example 16 and/or some other example herein, further comprising energizing the at least one electromagnet to move the package off of the platform body.

Example 19 may include the method of example 16 and/or some other example herein, further comprising deploying, based on the communication, the package delivery platform from a first position to a second position.

Example 20 may include the method of example 16 and/or some other example herein, wherein the at least one electromagnet comprises a plurality of electromagnets divided into sections about the platform body.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural, features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A package delivery platform configured to receive a package from a drone, the package including magnetic material, the package delivery platform comprising:
   a platform body;
   a first magnet and a second magnet disposed about the platform body;
   a controller configured to cause the first magnet and the second magnet to energize in order to secure the package to the platform body; and
   a transceiver configured to communicate with the drone;
   wherein the controller is configured to cause the first magnet to energize and the second magnet to de-energize to move the package from a first location on the platform body to a second location;
   wherein the platform body comprises a first position and a second position, wherein, upon receiving an indication from the drone, a landing surface of the platform body is configured to move from a first position to a second position to receive the package from the drone, and wherein the first position comprises a stowed position and the second position comprises a deployed position.

2. The package delivery platform of claim 1, wherein the first magnet comprises a first electromagnet, and the second magnet comprises a second electromagnet.

3. The package delivery platform of claim 2, wherein the first electromagnet is associated with a first section about the platform body, and the second electromagnet is associated with a second section about the platform body.

4. The package delivery platform of claim 2, wherein the controller is configured to cause the second electromagnet to energize and the first electromagnet to de-energize to move the package to a third location on the platform body.

5. The package delivery platform of claim 1, wherein the platform body comprises a first position and a second position, and wherein the controller is configured to cause the platform body to move from the second position to the first position when the package is at the first location on the platform body.

6. The package delivery platform of claim 5, wherein the controller is configured to cause the first magnet to energize and the second magnet to de-energize to move the package to the second location off of the platform body when the platform body is in the first position.

7. The package delivery platform of claim 5, wherein the controller is configured to cause the first magnet to energize and the second magnet to de-energize to move the package to the second location off of the platform body and into a container when the platform body is in the first position.

8. The package delivery platform of claim 5, wherein the controller is configured to cause the first magnet to energize and the second magnet to de-energize to move the package to the second location off of the platform body and into a storage area when the platform body is in the first position.

9. The package delivery platform of claim 1, wherein when in the second position, the platform body is in a horizontal configuration.

\* \* \* \* \*